US012762594B2

(12) United States Patent
Clauss et al.

(10) Patent No.: US 12,762,594 B2
(45) **Date of Patent: *Oct. 13, 2026**

(54) DATA BANK FOR MANAGING STREAMS OF PERSONAL DATA

(71) Applicant: STATE FARM MUTUAL AUTOMOBILE INSURANCE COMPANY, Bloomington, IL (US)

(72) Inventors: Mark E. Clauss, Bloomington, IL (US); Todd Binion, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,862

(22) Filed: Feb. 21, 2024

(65) Prior Publication Data

US 2024/0193654 A1 Jun. 13, 2024

Related U.S. Application Data

(63) Continuation of application No. 17/078,423, filed on Oct. 23, 2020, now Pat. No. 11,941,675, which is a (Continued)

(51) Int. Cl.
*G06Q 30/0601* (2023.01)
*G06F 16/2455* (2019.01)

(Continued)

(52) U.S. Cl.
CPC ... *G06Q 30/0611* (2013.01); *G06F 16/24568* (2019.01); *G06F 16/9535* (2019.01); *G06F 21/6209* (2013.01)

(58) Field of Classification Search
None
See application file for complete search history.

(56) References Cited

U.S. PATENT DOCUMENTS 9,853,959 B1 * 12/2017 Kapczynski ............ H04L 63/08
11,418,483 B1 * 8/2022 Cupp .................. H04L 63/0209

(Continued)

OTHER PUBLICATIONS

T. Masubuchi, M. Takatsuka and R. Sasaki, "A Digital Document Flexible Sanitizing Scheme," 2006 International Conference on Intelligent Information Hiding and Multimedia, Pasadena, CA, USA, 2006, pp. 89-92, doi: 10.1109/IIH-MSP.2006.264961. (Year: 2006).*

(Continued)

*Primary Examiner* — Michelle T Kringen
(74) *Attorney, Agent, or Firm* — MARSHALL, GERSTEIN & BORUN LLP

(57) ABSTRACT

A trusted data bank organizes and manages access to streams of personal data owned by users with their permission. The data bank accepts incoming streams of personal data from users (such as financial, utility account, medical, insurance, activity, hobby, life style, consumer preferences, commercial transactions, telematics or smart home data, etc.), and applies user-defined privacy directives. The data bank receives personal data stream criteria and offers for goods, services, discounts, or incentives from personal data consumers (end users). The data bank may compare available streams of personal data and associated privacy directives for potential matches with criteria specified by consumers of personal data, and display offers to qualifying owners of personal data streams. If the owner accepts the offer, the data bank facilitates supplying the personal data stream to the consumer of personal data, and retains the ability to discontinue access to the stream at the owner's request.

20 Claims, 13 Drawing Sheets

Related U.S. Application Data continuation of application No. 15/014,711, filed on Feb. 3, 2016, now Pat. No. 10,832,299.

(60) Provisional application No. 62/243,950, filed on Oct. 20, 2015, provisional application No. 62/121,979, filed on Feb. 27, 2015.

(51) Int. Cl.
*G06F 16/9535* (2019.01)
*G06F 21/62* (2013.01)

(56) References Cited

U.S. PATENT DOCUMENTS

| | | | | |
|---|---|---|---|---|
| 2007/0299891 | A1 | 12/2007 | Jopp et al. | |
| 2008/0168135 | A1 | 7/2008 | Redlich et al. | |
| 2009/0132395 | A1 | 5/2009 | Lam et al. | |
| 2009/0210423 | A1 | 8/2009 | Valz | |
| 2009/0240569 | A1 | 9/2009 | Ramer et al. | |
| 2011/0040691 | A1 | 2/2011 | Martinez et al. | |
| 2011/0313915 | A1 | 12/2011 | Tang | |
| 2013/0006748 | A1* | 1/2013 | Horvitz | G06Q 30/02 705/14.39 |
| 2013/0204669 | A1 | 8/2013 | Percy et al. | |
| 2013/0211876 | A1* | 8/2013 | Perler | G06F 21/31 726/28 |
| 2014/0229349 | A1 | 8/2014 | Yanev et al. | |
| 2015/0142686 | A1* | 5/2015 | Baldwin | G06Q 50/265 705/325 |
| 2016/0078490 | A1 | 3/2016 | Tumen et al. | |

OTHER PUBLICATIONS

Khatibloo et al., "Personal Identity and Data Management," *Forrester Research, Inc.*, Nov. 13, 2014.

Supriyo Chakraborty et al., "Balancing behavioral privacy and information utility in sensory data flows", Mar. 20, 2012, Pervasive and Mobile Computing 8 (2012) pp. 331-345.

Abstract idea examples, Jan. 27, 2015.

Zheng Qin, "Introduction to E-commerce", 2009, Springer, springer.com.

Non-Final Office Action for U.S. Appl. No. 15/014,711 dated Oct. 16, 2018.

Final Office Action for U.S. Appl. No. 15/014,711 dated May 1, 2019.

Non-Final Office Action for U.S. Appl. No. 15/014,711 dated Oct. 2, 2019.

Final Office Action for U.S. Appl. No. 15/014,711 dated Apr. 2, 2020.

Notice of Allowance for U.S. Appl. No. 15/014,711 dated Aug. 7, 2020.

Non-Final Office Action for U.S. Appl. No. 17/078,423 dated Aug. 19, 2022.

Final Office Action for U.S. Appl. No. 17/078,423 dated Jan. 31, 2023.

Non-Final Office Action for U.S. Appl. No. 17/078,423 dated Aug. 8, 2023.

Notice of Allowance for U.S. Appl. No. 17/078,423 dated Nov. 22, 2023.

* cited by examiner

DATA BANK FOR MANAGING STREAMS OF PERSONAL DATA

CROSS-REFERENCE TO RELATED APPLICATIONS

This application is a continuation of U.S. patent application Ser. No. 17/078,423 (filed Oct. 23 2020, and entitled "DATA BANK FOR MANAGING STREAMS OF PERSONAL DATA") which is a continuation of U.S. patent application Ser. No. 15/014,711 (filed Feb. 3, 2016, and entitled "DATA BANK FOR MANAGING STREAMS OF PERSONAL DATA") which claims benefit of the filing date of U.S. Provisional Patent Application No. 62/121,979 (filed Feb. 27, 2015, and entitled "DATA BANK FOR MANAGING STREAMS OF PERSONAL DATA") and U.S. Provisional Patent Application No. 62/243,950 (filed Oct. 20, 2015, and entitled "DATA BANK FOR MANAGING STREAMS OF PERSONAL DATA")—all of which are hereby incorporated by reference in their entireties.

TECHNICAL FIELD

The present disclosure relates generally to the field of data security and management with respect to streams of personal data. More particularly, the invention relates to a personal data bank to protect and manage personal data streams, and to act as a monetizing market exchange between owners and consumers of private data streams wherein personal data stream owners may share all or part of their streams with consumers of personal data in return for payments, goods, or other incentives.

BACKGROUND

Individuals are increasingly generating large amounts of personal data, often in the form of ongoing digital personal data streams wherein an activity by the user produces an output describing that activity. The output may be digitally stored and communicated with other parties, most often via the Internet. These personal data streams may originate from a variety of computing devices. Any personal data stream may be digitally stored, transmitted, and may be subject to periodic updates as the owner generates new pieces of personal data.

Owners of personal data streams increasingly show anxiety with respect to the security of their streams, not only because of risk of identity theft or financial loss, but also because of potential intrusion into their personal lives and loss of personal privacy. Personal data stream owners demonstrate a desire to organize and control access to their own data streams in response to these anxieties. Managing the data streams manually has several drawbacks, such as requiring significant effort and/or being beyond the technical sophistication of most users.

BRIEF SUMMARY

The present embodiments relate to a trusted third party acting as a custodian or banker to safeguard and manage individual streams of data. With an individual's permission or affirmative consent, a "data bank" may aggregate personal or sensitive data associated with the individual. The data may include financial, telematics, health and wellness, interconnected home, smart or autonomous vehicle, account, utility or vehicle usage, user geolocation information, "Internet of Things" (IoT) devices, wearables, browser data, and/or other data streams, including those mentioned herein. The data bank may act as a middleman and offers access to the individual's personal data to several end users, such as via an online auction. The bids for access to the individual's personal data may be pushed to the individual by the data bank. If a bid is accepted and data access granted, the end user may perform computer analysis on the individual's personal data to provide tailored offers for goods or services based upon the individual's personal data, such as data that reveals preferences and/or unmet needs of the individual for certain types of products or services (e.g., specific types of vehicles, home equipment, clothing, restaurants, movies, entertainment, vacations, etc.). An individual may also be provided revenue or monies in return or exchange for providing access to their individual data.

In one aspect, a computer-implemented method of operating a data bank of personal data may be provided. The method may include, with an owner of personal data's permission or affirmative consent, (1) receiving a stream of personal data corresponding to an owner of the personal data; (2) receiving, from the owner of the personal data, a privacy level directive corresponding to the stream of personal data, the privacy level directive identifying at least one category of non-sharable data in the stream of personal data; (3) receiving, from a personal data consumer, a set of personal data criteria; (4) in accordance with the personal data criteria and the privacy level directive, matching, via one or more processors, the personal data consumer with the stream of personal data; (5) receiving, from the personal data consumer, offer terms; and/or (6) presenting, via the one or more processors, the offer terms, to the owner of the personal data, to facilitate operating a data bank of personal data and/or receiving offers for access to personal data. The method may include additional, less, or alternate functionality, including that discussed elsewhere herein.

In another aspect, a computer-implemented method of granting access to personal data streams may be provided. The method may include, with a user's permission or affirmative consent, (1) establishing, via one or more processors, a data bank account for a user, the data bank account managing access to a plurality of personal data streams for the user; (2) receiving, via the one or more processors, a user selection of a type of personal data streams to deposit in the data bank account; (3) receiving, via the one or more processors, permission from the user to grant access to one or more of the deposited personal data streams to a third party end-user to complete a personal data-related transaction between the third party end-user and the user; (4) responsive to receiving the permission, granting, via the one or more processors, access to the one or more of the deposited personal data streams to the third party end-user; and/or (5) updating, via the one or more processors, a display of personal data-related transactions to include an indication of the completed personal data-related transaction to facilitate the user monitoring and controlling their personal data and/or personal data stream transactions. The method may include additional, less, or alternate actions, including those discussed elsewhere herein.

In another aspect, a computer-implemented method of managing access to streams of personal data may be provided. The method may include, with a user's permission or affirmative consent, (1) receiving a stream of personal data owned by a user, the stream of personal data including data generated by the user and data pertaining to an identity of the user; (2) receiving, from the user, a privacy level directive for the stream of personal data identifying at least one category of non-sharable data in the stream; (3) in accordance with the privacy level directive, redacting the at least one category of non-sharable data from the stream to generate a sharable personal data stream; (4) receiving, from the user, an indication of permission to grant access to the shareable personal data stream to a consumer of personal data; and/or (5) granting, to the consumer of personal data, access to the sharable personal data steam to facilitate managing access to personal data. The method may include additional, less, or alternate actions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

Figure 1A:
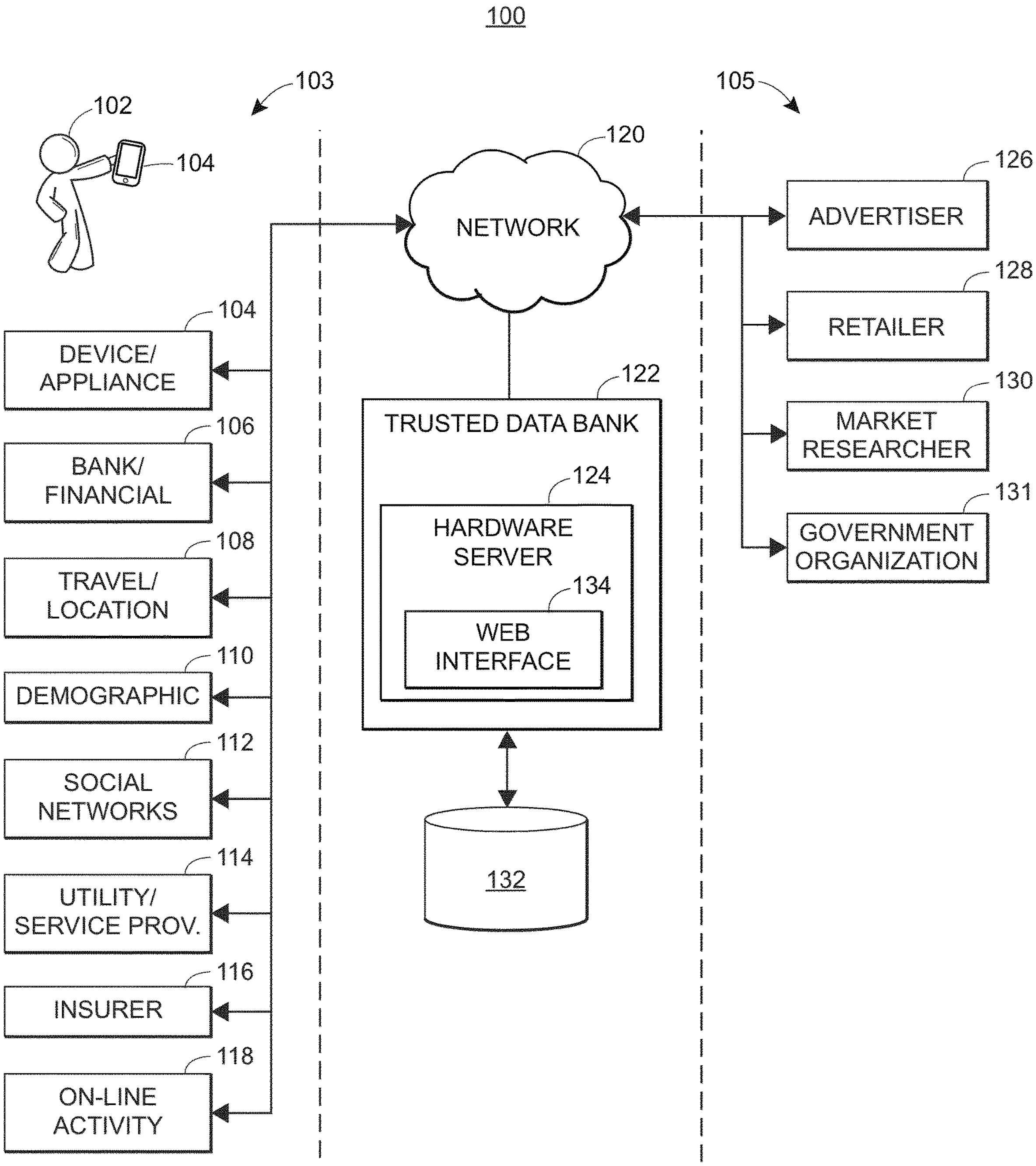
FIG. 1A depicts an exemplary environment including components and entities associated with managing, banking, and monetizing an individual's personal data streams in accordance with some embodiments.

The present embodiments may include a "data bank" that is an intuitive, reliable, and secure solution for consumers to manage and protect their personal information. The personal data may include a wide variety of data, such as financial, employment, medical, insurance policy, age, address, consumer product or service preferences, hobbies, activities, life style, marriage status, location, social media, shopping habits, technology usage, vehicle information, vehicle or mobile device usage, home features, clothing preferences, dining or travel preferences, utility or energy usage, other items discussed herein, etc. The data bank may provide visibility into an individual's or a family's data sharing agreements, and help consumers secure and share digital information with end users (such as merchants, or service or product providers) following the consumer's permissions and/or instructions.

In one aspect, banking or bank-type services may be provided. In addition to storing personal data, services may be provided to help store, share, and track all of an individual's personal data transactions. With respect to auto telematics, an aggregator may collect all the automotive telematics data and enable customers to share it with an insurer or other company of their choice. The present embodiments recognize that data collection is more of a commodity and the proprietary aspect is which data elements the insurer chooses and then how they use the data they receive. In one embodiment, the present banking services data concept may be focused on the overall data exchange process—giving customers better control and awareness of what data they're sharing and who with.

The present embodiments relate to storing and sharing the data streams that will be generated from (1) all the devices enabling the "Internet of Things", (2) smart or autonomous vehicles, (3) smart or interconnected homes, (4) mobile devices (e.g., smart phones), (5) wearables, and/or any other device that generates data. Another aspect of the "service" may relate to offering "software" to help monitor and control the flow of data. Consumers may want to maintain all of their own data, but a "bill pay type interface" may be provided that consumers may use to help control, monitor, and/or track all their data transactions. In this respect, the software may be a service type model.

In general, with conventional techniques, certain consumers may agree to multiple user agreements, making it difficult for them to remember what they have agreed to, when they agreed to it, what data is being collected, and/or how the data is being used. On the other hand, the data bank may be to data what current banks are to financial transactions—holding the asset (personal data) and following directions from the account holder on how much data to share and with whom. After any personal data is shared (a data transaction), "statements" may provide audit trails of what data was shared ($$$) and who received it (payee). In one embodiment, the data bank may operate as a middle man between an individual (or family) and entities or merchants (personal data end users) that desire to use the personal data of the individual (or family).

The data bank may be provided or operated by a business, such as by a financial services and/or insurance provider. Further, benefits to the owner of the data may include data security, control and potential for compensation in exchange for sharing data with other parties. The data bank and/or data bank operator may also validate the businesses (personal data end users) allowed to participate in the approved "network" for data exchange to put consumers at ease. The data bank operator may leverage existing business registries (e.g., Dun & Bradstreet) within the network to reduce administrative work and confusion.

This service (i.e., data bank) in essence may become a data aggregator for transactional data like vehicle telematics, intelligent homes, wearable technologies, etc. The data bank may also aggregate browser data, such as search history and/or other usage information (e.g., data monitored by a "cookie"). Once data is stored in the data bank, a user may control access to any type of data, such as by providing control over whom the data is shared with and what data is actually included in a shared data stream. The data bank may maintain one profile of answers to common questions for an individual or family to help ensure consistency and up-to-date information that otherwise may become outdated and inaccurate.

The data bank may be a consumer tool bringing transparency, consistency, and simplicity to personal data management. The data bank or data bank operator will not have access to use the data unless opted-in by the consumer, just like all the other companies participating in the network. The data bank is intended to provide a trusted service to consumers to help them manage their data. For example, "portability" of data may be extremely beneficial to the owner of the data. This is applicable when a data owner changes from one manufacturer platform to another manufacturer platform. As an example, a fitness-related data stream may continue to be shared when a data owner switches from using a Fitbit® wearable to a Garmin wearable. Said another way, the data feeds into the data bank regardless of the specific source of the data. As a user changes from one device or "system" to another, the user may have all of the user's data from all sources consolidated to the data bank.

Additionally or alternatively, an online auction service may allow companies to bid on profiles of desired consumers. The data bank may deliver to the consumer one or more options to sell their personal information, such as for monies, reward points, or for new products or services (or related offers). For instance, bids from end-users for personal information (or certain types of personal information) may be pushed to individuals or families. Recommendations for certain service providers (such as certain merchants, financial services providers, insurance providers, etc.) may also be provided to the consumer by the data bank if they opt-in for the value added service.

Digital protection is a growing need for consumers that may be included within the insurance and financial review (IFR) by insurance agents identifying risks and financial needs. Being a non-insurance product, the recurring service fees may be tiered to reward an insurance provider's best multi-line customers. The data bank may potentially shift some or all of the cost to participating companies as an easy way to show transparency and create trust in how consumer data is being used.

An insurance element may also be included to protect and preserve digital content as part of the data being managed. Unlike physical financial documents that may be difficult or expensive to try and protect from loss due to fire, storm, water, etc., the digital financial documents/data, and/or other personal data may be more easily kept safe or kept from total loss due to an insurance-related event (fire, flood, etc.). As a result, a fear of losing important data or records may be alleviated by the data bank embodiments discussed herein.

In one aspect, information may be organized by household (i.e., marital unit, family unit, etc.). Doing so may allow parents to manage information about individual family members within their extended families. For instance, the data bank may provide a more personalized and immersive experience for those caring for aging parents, children, or other family members that are less tech savvy.

The data bank may serve as the middleman/aggregator for data exchanges between consumers and businesses. The data bank may also provide reporting/visibility into the data trails, and the opportunity for customers to auction off their data to competing businesses.

The data bank may be a fee-based service, such as a monthly or annual subscription service. For example, a fee may be periodically charged for each individual or family profile that the customer wants to manage or generate. Alternatively, the data bank could be provided free of charge to existing customers.

In one embodiment, the data bank may be operated or run by an insurance provider. The insurance provider, in addition to offering data bank services related to an individual's personal data, may provide financial and insurance products to customers, such as auto, home, life, renters, or health insurance, or home or vehicle loans. With the individual's permission, the insurance provider may tailor certain insurance products (or bundles of insurance products) and/or offer specific discounts based upon the individual's personal data and/or personal data streams.

Exemplary Data Streams

The present embodiments relate to organizing and managing access to streams of personal data owned by users. The personal data streams may originate from any of a variety of sources, including wearable tech, devices associated with the Internet of Things, interactions between the owner and on-line accounts, either accounts associated with services to which the owner is a customer and/or subscriber to social networking accounts, activities of the user on the World Wide Web or Internet, from the user's transportation activities, from mobile handheld devices, and/or as demographic, employment, financial, or other information associated with the user. The data bank organizes any personal data streams supplied by a user, and provides transaction screens for the user to view each piece of data and metadata associated with his streams, including the time of transmission to a consumer of personal data, if the stream in question is subject to a sharing agreement. Additionally, regardless of the data source, the personal data streams feed the data bank, which stores all of the personal data. For example, when a user switches from one source to another source, the personal data may still seamlessly be stored in the data bank.

Wearable devices, also known as "wearable tech," are increasingly common, and are available in a number of forms such as smart wristbands, sleep monitors, pedometers, smart watches or bracelets, activity monitors, smart socks, smart glasses, smart rings, and bike computers. These devices may be equipped with sensors to detect information about their environment, and about the person wearing them. The sensors may include a GPS (Global Positioning System) antenna, a heart rate monitor, pressure sensors, accelerometers, a compass, microphones, heat sensors, barometers, clocks, cadence sensors, thermometers, and any other type of sensor that may be attached to a mobile device.

Wearable tech generates and stores a wealth of information pertaining to the owner, his or her location, and their activities. The owner may add additional data into the wearable tech data stream about himself, such as weight, age, maximum heart rate, gender, and more.

The so-called "Internet of Things" is another rich source of personal data streams. The Internet of Things is the interconnection of uniquely identifiable embedded computing devices within the existing Internet infrastructure. These devices are often located inside the home or workplace, and generate streams of data relating to their environment and the parameters of their operation. Virtually any digital device may be incorporated into The Internet of Things, such as thermostats, kitchen appliances, televisions, DVD players and DVRs, digital media players, micro-consoles, home network devices, radios, video cameras, motion sensors, water heaters, fans, sunlight sensors, security equipment, carbon monoxide monitors, sound sensors, smoke detectors, manufacturing equipment, air quality sensors, pieces of furniture, electric window shades, webcams, home automation and control systems, HVAC equipment, home battery systems, solar power systems, electric utility systems, gas utility systems, baby monitors, light fixtures, irrigation systems, unmanned aerial systems, automobiles, and more.

These devices may record and report data streams regarding their current hardware, firmware, and software versions; uptime measurements; operating parameters, such as whether the device is on or in a stand-by mode or whether the device is open or closed; and/or the age of the device. The devices may record and report data streams regarding statistics on available system resources, such as memory, available network bandwidth, battery power, utilization rate, mean time to failure, maintenance schedule, available communications ports to connect to other devices, and/or other items.

Interactions between users and institutions or service providers via on-line accounts are another area generating many streams of personal data. Traditional banking or financial account customers may create logs of interactions with their account, either via a website interface or mobile application interface, relating to the various transactions, such as deposits, transfers, withdrawals (via ATM, thus also revealing the customer's location at that time, by check, or types of withdrawals), recurring bill payments, etc. Debit and credit card on-line accounts may reveal almost the entirety of an owner's spending habits, especially if he prefers not to use cash for everyday transactions. Other accounts, such as with an electric utility, may generate information including monthly usage rates and prices paid per unit of electricity. Similarly, mobile accounts may fill with logs of telephone calls, mobile bandwidth usage, SMS logs, and information regarding the user's handheld device including make, model, age, and time left until the device may be eligible for an upgrade with the mobile carrier.

Activities on the World Wide Web or social networks generate streams of personal data associated with the online habits of the owner. Browsers contain information about personal data owners, such as browsing history, HTTP cookies, Flash cookies, Evercookies, website preferences, browsing habits, web form submission data, a browser's DOM (document object model) information, search engine history, and/or almost any type of information that can be collected from the owner's activities using browser-embedded JavaScript. Devices used to connect to the Internet or World Wide Web may leave behind device fingerprinting data.

Similarly, social networks generate data relating to posts the user has made, viewed, shared, liked, marked as a favorite, saved, or commented on. Social networks may also reveal information about the owner, including content that he views favorably and data relating to his contact network. When a user of a social media service visits a restaurant, business, organization, house of worship, public facility, government facility, or any part of the national transportation network, he or she may register that activity as a "check-in" or visit with a social network, thereby identifying the user's location and data regarding the user's preference for commercial, recreational, or travel activities. Social network personal data streams may also include photographs in which the owner was tagged together with other individuals, indicating the user's social preferences and other users with which he has IRL (in real life) contact. The account owner's opinions and other public statements may also comprise a personal data stream originating from a social network.

The area of transportation may be another abundant source of personal data streams. Automobiles may be equipped with mobile operating systems, such as Google, Inc.'s Android operating system or Quantum Software System's microkernel, that may serve as platforms for the collection, storage, and transmission of personal data streams. Available sensors on automobiles for the collection of personal data may include oxygen sensors, brake sensors, engine diagnostic code units, engine temperature sensors, tire pressure sensors, altimeters, battery meters, humidity sensors, transmission data, hands-free voice system usage, satellite radios, tachometers, seatbelt sensors, RFID sensors, weight sensors in seats to detect occupancy and on the suspension to detect total vehicle load, proximity sensors, fuel gauges, and any other sensor or device configured to sense and report telemetric data. Satellite navigation systems, GPS antennas, and Wi-Fi antennas may also be present to provide geolocation information into the system regarding the automobile's, and therefore also the user's, location.

Public transit use may be another type of transportation-related activity producing personal data streams. Public transit riders often have accounts into which they may deposit money for fares that are then debited whenever the transit user makes a trip by train or bus by swiping a card with an RFID tag associated with the owner of the account. The transit card swipe may produce data such as date and time of all trips, origin location of trips, amount of fare paid, and any transfers the transit rider makes.

Bicycle sharing systems may be another type of public transportation that may generate personal data regarding the user. The user may have a bicycle share account that records information such as length of trips, amount of bicycle time used for each trip, starting docking station and check-out time, and destination docking station and check-in time.

Smartphones, cameras, and other digital devices may also generate streams of personal data. Digital photographs produced by these devices, in particular, often associate EXIF (exchangeable image file format) data with each photo, revealing information about the device and a timestamp, but also increasingly tagged with geolocation coordinates revealing the exact worldwide location of the photograph. The photos may be automatically uploaded into a cloud service, revealing prior locations of the owner as well as the dates and times he or she was at those locations. Smartphones may also produce personal data streams based upon, for example, music streamed by the owner or other applications relying on the device's GPS system to tag the owner at specific locations and times, even sometimes labeling those locations based upon names specified by the user, such as the owner's home, office, place of business, etc.

Demographic data and information may also be suitable for presentation in the form of a personal data stream.

Information about an individual, such as age, gender, personal or household income level, highest educational level attained, home zip code, preferences for travel, employment history, marital and family history, race, past contributions to politicians or PACs (political action committees), credit score history, and net worth, may comprise a personal data stream of information pertaining to the user. Like the personal data streams discussed above, demographic data streams may be subject to continuous revision as the various aspects of the individual's life change.

Collection and storage of personally identifiable information and other sensitive information in the variety of available personal data streams discussed above present serious issues with respect to the data stream owners' privacy. The information contained in these personal data streams likely comprises information about the owner he or she does not wish to share. An attacker with access to a user's personal data streams may be able to analyze the steams to derive detailed information about the user's daily activities, habits, location, employment, friends, family, and/or other information that has traditionally been subject to an expectation of privacy. Personal data stream owners are aware of these privacy issues, and are increasingly seeking ways to protect their personal data streams.

Another result of the increased availability of personal data streams may be the ease by which they may be shared with third parties. Personal data stream owners may be bombarded with requests to share their streams, and it may be difficult to track and monitor which data is accessible to third parties. Indeed, personal data stream owners may forget that they granted access to a data stream long ago that may still be mined by a third party despite the owner's preference that the information no longer be shared with that party. Phishing attacks may steal a personal data stream from an owner by tricking the owner into thinking he or she was merely granting access to a trusted third party.

Once the user has granted access to one or more personal data streams to the trusted data bank, he or she may associate privacy directives with each owned stream and/or for all streams collectively. The data bank may solicit personal data stream criteria from any number of third party consumers of personal data streams according to any type of data stream sought by the data consumer. Consumers of personal data may be market research organizations seeking to discovery preferences of consumers in certain demographic groups according to household income, age, location of residence, and/or any other factor. Consumers of personal data may be market participants seeking to determine market share of competitors, or data regarding which of their competitors' products are being purchased by their own customers. The consumers of personal data may be utility and/or service companies seeking access to their customers' data streams in order to formulate new products and/or to deliver their current products at a discount. The consumers of personal data may be simply any entity that recognizes value in access to streams of personal data and/or portions of streams of personal data, and are willing to offer incentives in return for access to that data.

The data bank, recognizing the value of personal data to consumers, relies on the privacy directives established by the personal data stream owners to identify possible matches between owners and consumers. A recommendation engine may present possible matches to owners of personal data streams in the form of offers for the goods, services, discounts, and/or other incentives in return for providing partial or complete access to one or more of the owner's personal data streams. The owner of the personal data stream may choose to accept, reject, or hold any incentive offer in abeyance as long as the consumer holds the offer open.

Pricing access to streams of personal data may be accomplished via an auction system. Consumers of personal data may search available data streams according to desired criteria, and/or may view streams or bundles of streams available for bidding. Each auction may be associated with a termination date, and/or potential consumers of the data may enter bids to determine the market price for access. Personal data streams available for auction pricing may include streams for which owners have approved access in advance of the auction according to pre-determined privacy directives.

The personal data stream owner maintains control over his streams at all times because the data bank permits the termination of sharing streams with third parties pursuant to the conditions of any accepted offers. A user may view screens depicting all of his shared data, and/or a transaction log identifying each discrete piece transmitted to the personal data consumer as part of each stream. By trusting the data bank with streams of personal data, the owner is protected from third party phishing attacks and other malicious attempts to obtain unauthorized access to his data streams.

The personal data bank may be viewed as a marketplace or ecosystem for sharing data on the owner's terms. The virtual data bank may provide recommendations or ratings, such as color coding, transparency, simplified decisions, and cost-effective standardization. The personal data bank may be analogized to a traditional bank in that it holds or secures assets on behalf of the owner. In the case of a traditional bank, the assets are US dollars or other securities. With the present embodiments, the assets are of a virtual nature and include the owners' personal data. Like a traditional bank, the data bank may execute transactions at the direction of the owner, and, like a traditional bank, the data bank may account for transactions and applies security. The personal data bank may operate in this regard like a clearing house for ACH payments in the traditional banking sector.

Exemplary Personal Data Bank Management

The novel systems and methods disclosed herein relate generally to organizing and managing streams of personal data. In particular, the systems and methods may take streams of personal data as inputs, and permit the owner to control access to those streams. According to certain aspects, the data bank may present offers to an owner of a personal data stream on behalf of a consumer of personal data for incentives to share the data stream, or portions of the data stream, with the consumer.

The systems and methods therefore may offer a benefit to owners of personal data streams by monetizing or otherwise deriving a benefit for the owner in return for sharing the data with a personal data consumer (such as sharing data after the owner 'opting in' into a personal data program or signing up with a personal data bank or merchant, or consumer of personal data). The systems and method may also offer a benefit to consumers of personal data who wish to have access to personal data streams to exploit the rich source of consumer behavior and preferences contained therein. The systems and methods described herein may also achieve the goal of determining an appropriate market value of the personal data streams according to an auction mechanism in some embodiments.

As used herein, it should be appreciated that the terms "personal data stream," "data stream," and "personal data"

all refer to data pertaining to an individual, business, household, organization, and/or other entity associated with or producing the underlying data. The term "owner" should be understood to refer to any entity or person who retains a desire to preserve control over data in a data stream. The personal data streams may originate from any of the sources discussed herein, as well as any digital device or activity conducted either in the real world or on-line.

Although the following text sets forth a detailed description of numerous different embodiments, it should be understood that the legal scope of the invention is defined by the words of the claims set forth at the end of this patent. The detailed description is to be construed as exemplary only, and does not describe every possible embodiment or variant of the invention, as describing every embodiment or variant would be impractical, if not impossible. One could implement numerous alternate embodiments, using either current technology or technology developed after the filing date of this patent, which would still fall within the scope of the claims.

Exemplary Environment for Managing Personal Data Streams

FIG. 1A depicts an exemplary environment 100 associated with a trusted databank for organizing and managing personal data streams. Although FIG. 1A depicts certain entities, components, and devices, it should be appreciated that additional or alternate entities and components are envisioned. Environment 100 may be divided into sources of personal data 103, a trusted data bank 122, and/or consumers of personal data 105. Each of the entities herein may communicate with any other entity via public or private network 120.

As illustrated in FIG. 1A, the environment 100 may include a personal data stream owner 102 that may be any type of user, including an individual person, business, organization, entity, association, firm, or group of people. The owner 102 may be associated with any number of personal data streams 104-118 as shown in FIG. 1A. In some cases, the source of the personal data stream may originate from an electronic device or appliance 104. It will be appreciated that any type of electronic device or appliance is envisioned. In other cases, the source of the personal data stream may originate from owner 102's account at a bank or financial institution 106, and/or utility or service provider 114. In still other cases, the source of the personal data stream may originate from owner 102's interactions with social networks 112 and/or on-line activities 118. In still other cases, the source of the personal data stream may originate from the owner's current geolocation 108. In yet other cases, the source of the personal data stream may originate from demographic information 110 supplied by the user or mined from other available sources.

FIG. 1A further illustrates consumers of personal data in section 105. These may include, for example, third-party advertiser 126, third-party vendor 128, third-party market researcher 130, and/or any other entities that seek to gain authorized access to one or more streams of personal data via trusted data bank 122.

In the case of a personal data stream originating from an electronic device or appliance 104, the device or appliance may be configured to communicate via network 120 on any standard or technology (e.g., GSM, CDMA, TDMA, WCDMA, LTE, EDGE, OFDM, GPRS, EV-DO, UWB, IEEE 802 including Ethernet, WiMAX, Wi-Fi, and/or others). According to embodiments, trusted data bank 122 may include one or more hardware server(s) 124 configured to facilitate the functions described herein. Although FIG. 1A depicts the hardware server 124 as a part of trusted data bank 122, it should be appreciated that the hardware server 124 may be separate from (and connected to or accessible by) the trusted data bank 122.

Hardware server 124 may be coupled to a database 132 configured to store various data received from the various sources of personal data 104-118 controlled by owner 102. In some embodiments, database 132 may be configured according to known types of personal data sources such as, for example, with appropriate fields to store transactional data received from bank or financial account 106, known instances of devices or appliances 104 that report data according to pre-defined fields, etc. Hardware server 124 may further comprise a web interface 134, communicatively coupled to database 132 and/or network 120 to facilitate the receipt and communication of the personal data streams and associated communications, such as privacy level directives and/or personal data stream search criteria as described herein.

Exemplary Personal Data Stream Management and Sharing

Figure 1B:
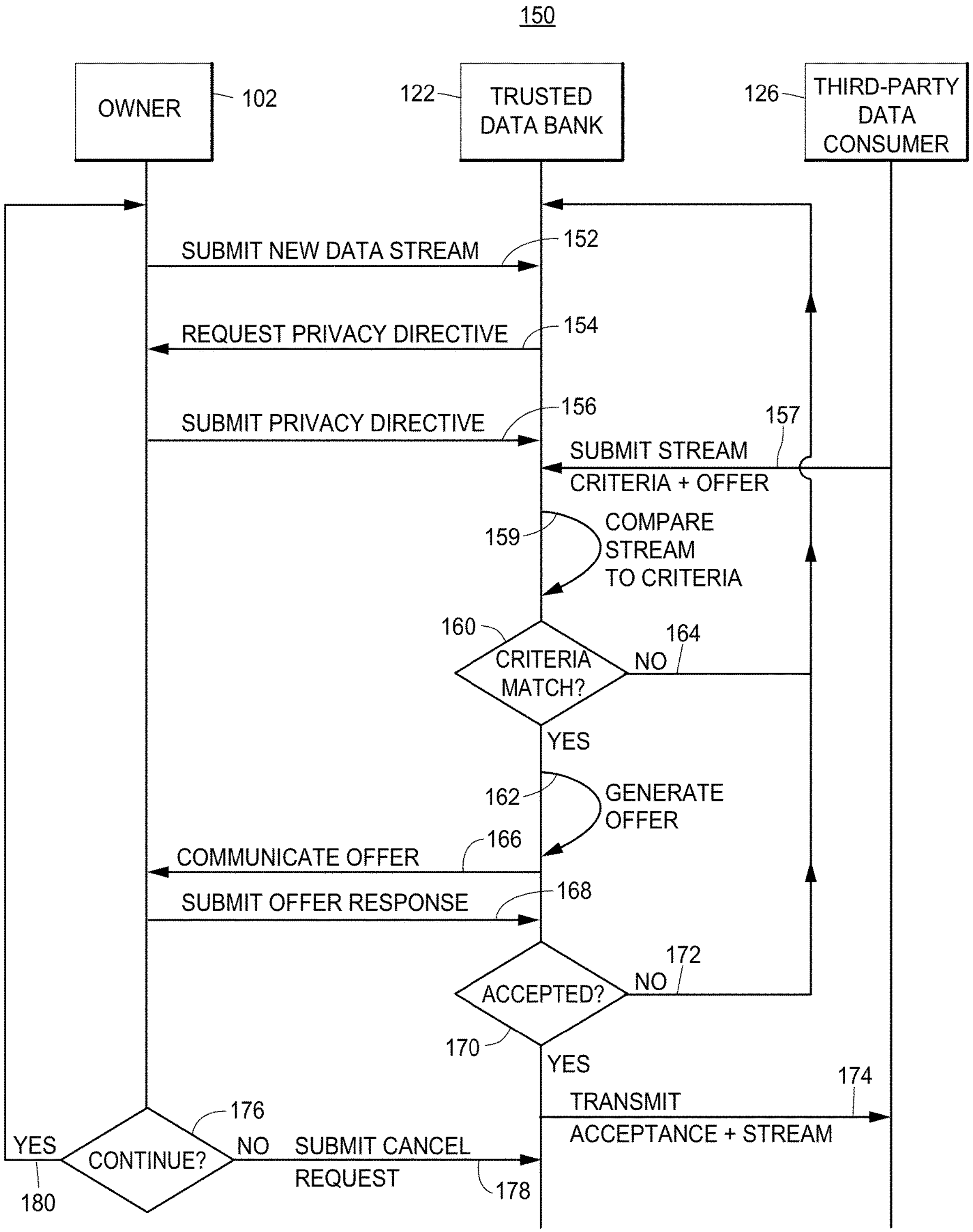
FIG. 1B depicts an exemplary signal diagram associated with banking and sharing an individual's personal data streams in accordance with some embodiments.

Referring now to FIG. 1B, there is illustrated an exemplary signal diagram 150 associated with receiving one or more streams of personal data from an owner 102 (such as those described herein) with associated privacy directives, receiving personal data stream criteria and incentive offers from a consumer of personal data 126, presenting the offers to the owner 102, and/or facilitating the sharing of the stream of personal data contingent upon the acceptance of the offer by owner 102.

The signal diagram 150 may begin when the owner 102 of a personal data stream transmits the stream or grants access to the stream (152) to trusted data bank 122. Trusted data bank 122 may request a privacy directive (154) from owner 102 to associate with any received personal data stream and/or to apply to all personal data streams managed on behalf of owner 102. The request for privacy directive may include limitations on the viewable information available on the stream to any third-party data consumer 126 such as, for example, the owner's name and other identifying information such as age or location, and whether the owner 102 agrees to provide the stream separately or only as part of a tranche of anonymized personal data streams (and/or whether the owner places other conditions or limits on the use of their personal data).

Owner 102 may submit his or her privacy directive (156) to trusted data bank 122 in response to the request for privacy directive. In some embodiments, owner 102 may submit the privacy directive without receiving a request, as part of his initial submission of a new personal data stream, as a request to add a privacy directive to an existing personal data stream, and/or as a request to modify an earlier privacy directive. After receiving the privacy directive from owner 102, trusted data bank 122 may extract the preferences expressed therein, and/or apply them owner 102's personal data stream.

Trusted data bank 122 may receive personal data stream criteria and an associated offer or offers (157) from a potential consumer of personal data 126. As described below with reference to FIGS. 8 and 9, the data stream criteria may be search criteria chosen by the potential consumer of personal data 126 against which a search may be run by trusted data bank 122 on available streams of personal data.

The criteria may serve an important purpose in the operation of the data bank because it permits consumer of personal data 126 to identify the pieces of information that are important to it. A potential consumer of personal data 126 may not care to know about certain aspects of data streams if its intended analysis does not depend upon it. For example, a retailer evaluating potential locations for new retail stores may wish to gather data on foot traffic in the areas of the respective stores. The retailer may be interested in knowing the number of people in the area and their average household incomes, but may not value their home zip code or legal names. This retailer may include household income in its search location-based criteria, but not unnecessarily narrow the results by including further personal or identifying information.

Owners of personal data may have individual preferences regarding the level of personal privacy they desire, and/or the level of identifying information they are willing to share. Some may refuse to share any identifying or demographic information at all, and may insist on sharing only completely anonymized streams or streams that are stripped of most or all demographic information. The personal privacy directive may allow the owners of the streams to establish sharing parameters consistent with their own preferences, regardless of the level. This approach is consistent with the premise that the owners of the personal data streams retain certain rights in those streams with respect to their privacy, and therefore should remain in control of those streams.

The term data stream “owners” is used herein to reflect the manner in which the personal data streams are handled. This approach is also intended to present to the potential consumer of personal data 126 the largest number of personal data streams that would likely satisfy its need, thereby generating the greatest number of potential matches between personal data stream owners and consumers consistent with the privacy directives established by the owners.

Received search criteria may then be compared to personal data streams (159) for which the owners may receive offers from the personal data consumers 126. For each such candidate personal data stream, if there is a match between the privacy directive and the search criteria (160), an offer may be generated (162), or, if there is no match, trusted data bank 122 may analyze the next available stream (164). If an offer has been generated, it is communicated to the owner of the stream (166), and the owner's acceptance or rejection may be submitted in response to the offer back (168).

If the offer is accepted (170), the personal data stream may be shared with consumer of personal data 126 according to the terms of the offer (174), and the stream may appear in the owner's personal data stream management screens as shown below in more detail with respect to FIGS. 5 and 6, and the discrete pieces of data or transactions in the stream will be available for viewing by the owner as described below with reference to FIG. 7. If the offer is not accepted by the owner (172), trusted data bank 122 may advance to the next available personal data stream for analysis. Alternatively, the data bank 122 may enable the owner 102 to generate a counteroffer to the consumer of personal data 126. All communications referred to herein may be accomplished according to any known method or protocol, including via a web page, an API such as a RESTful HTTP API, or a mobile app.

Pursuant to the principle that each owner 102 of personal data streams retains privacy rights and control over the streams, owner 102 may, at a future time, elect (176) to discontinue sharing of the stream with consumer of personal data 126. If the owner does so elect, then the personal data stream transmission will terminate (178), provided there is no provision in the offer that the stream must be shared for a minimum amount of time. For example, a time provision may be agreed upon in order to receive the offered incentive. If the owner 102 terminates access to the stream, an early termination fee may be assessed and/or any unpaid benefits and/or fees may be pro-rated. If the owner 102 elects to continue sharing the stream or simply takes no action, trusted databank may continue operation (180) according to the signal diagram of FIG. 1B.

Exemplary User Interface for Personal Data Stream Owners

Figure 2:
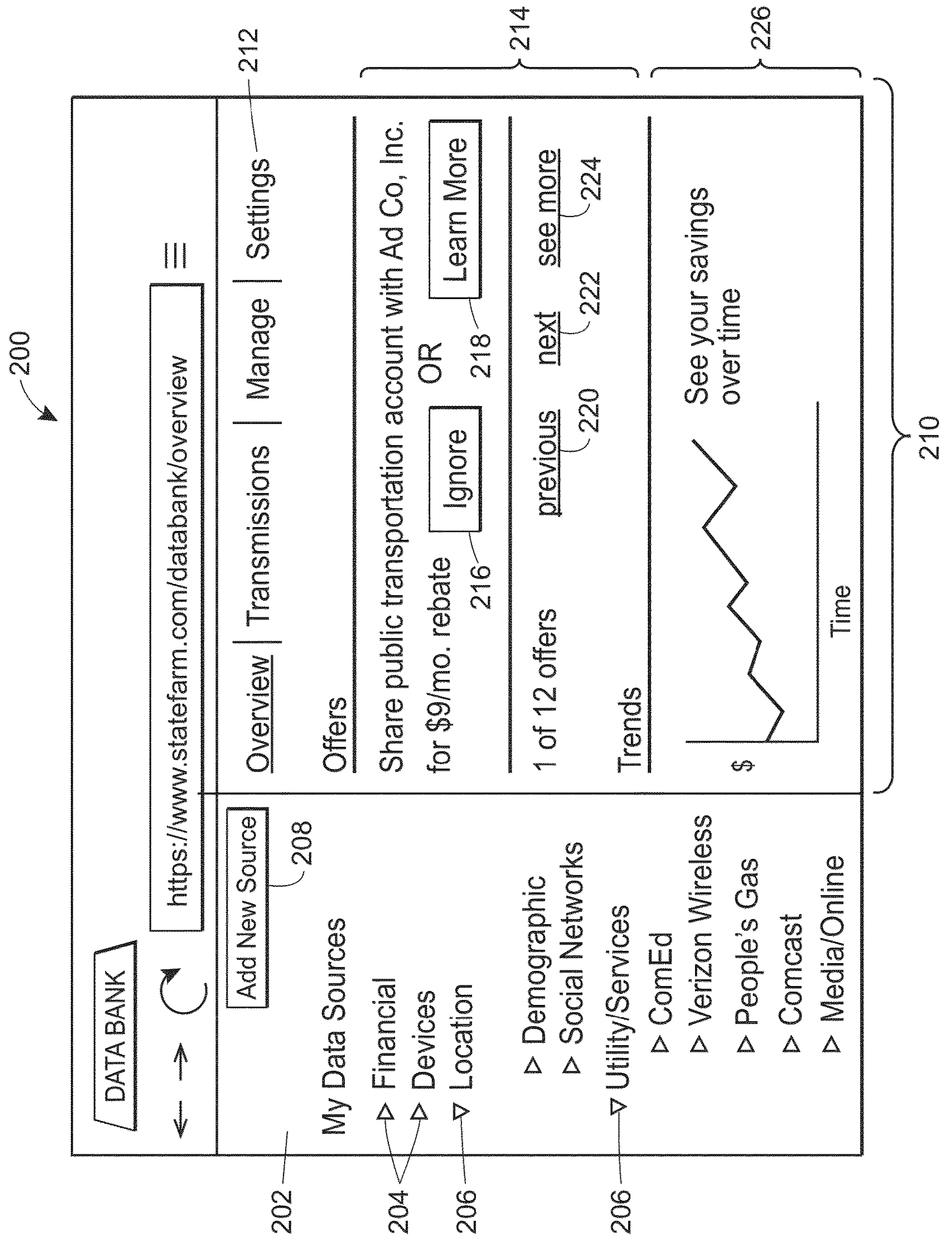
FIG. 2 depicts an exemplary personal data bank overview screen displayable by a personal data stream owner's device in accordance with some embodiments.

FIG. 2 illustrates an exemplary web page that displays overview information to an owner of personal data streams that have been deposited with trusted data bank 122. Web page 200 may include a sidebar 202 to organize the deposited personal data streams by category such as financial, devices, location-based, social networks, utility/services accounts, and/or media/online activities. Other categories are envisioned consistent with embodiments of the invention described herein. Sidebar 202 is shown in FIG. 2 as displayed using a tree widget with collapsible levels, accessed by the owner using the arrow indicators 204, 206. Collapsed levels are indicated by a horizontal arrow (204), and expanded levels are indicated by a downward-facing arrow (206). Other presentations of sidebar 202 are envisioned consistent with embodiments of the invention.

As can be seen in sidebar 202, the utility/services category is expanded, showing four of the owner's account trusted data bank 122. By clicking on these accounts or any other sources accessible via sidebar 202, the owner may browse the banked streams of personal data. Add New Source button 208 may present a dialog box to the owner (not shown) for adding new personal data stream sources. Trusted data bank 122 may be programmed to interact with any number of sources of personal data via a public or private API or other known methods, and may present a search box and list to the owner from which he may select the desired streams to add. In one embodiment, the owner must input login credentials associated with the stream of personal data to enable trusted data bank 122 to access data on behalf of the user via the API or other method of accessing the data source. It should be appreciated that any presently-known or future-developed authentication techniques are envisioned.

Web page 200 may include information window 210 to display selected information to the user. Information window 210 may include a navigation bar 212 for the user to select the information displayed in window 210. In one embodiment, navigation bar 212 may include links to screens corresponding to an overview, a transmission log for streams of personal data, a management screen for offers relating to the sharing of personal data streams, and/or a settings screen for managing the owner's account and trusted bank preferences. FIG. 2 depicts information window 210 showing the overview screen, and other figures described herein will illustrate information window 210 displaying other screens accessed via navigation bar 212.

Overview screen may include an incentive offer display banner 214 for displaying a particular offer to an owner of a stream of personal data matching criteria submitted by the entity offering the incentive. FIG. 2 illustrates a sample offer on behalf of “Ad Co., Inc.” for a $9 rebate on the owner's bill for sharing the owner's public transit account information. Incentive offer display banner 214 may include ignore button 216 and learn more button 218 to remove the ad or display additional terms and conditions to the owner in offer details screen 400 as shown herein in FIG. 4. In some embodiments, the owner may browse other available offers by clicking on the previous and next links, shown as numerals 220 and 222, respectively. See more button 224 may display similar or other incentive offers, including offers or discounts on good or services, or monies or revenue to be paid to the data owner or individual for allowing access to their data.

Web page 200 may also include trends display area 226 for visual presentation of the owner's incentive history over time. Trends display area 226 may show savings or value of goods or services received in return for sharing personal data streams with consumers of personal data according to the terms and conditions of offers presented to the owner on trusted data bank 122. Web page 200 may include additional, less, or alternate functionality, including that discussed elsewhere herein.

Exemplary Privacy Directive UI for Personal Data Stream Owners

Figure 3:
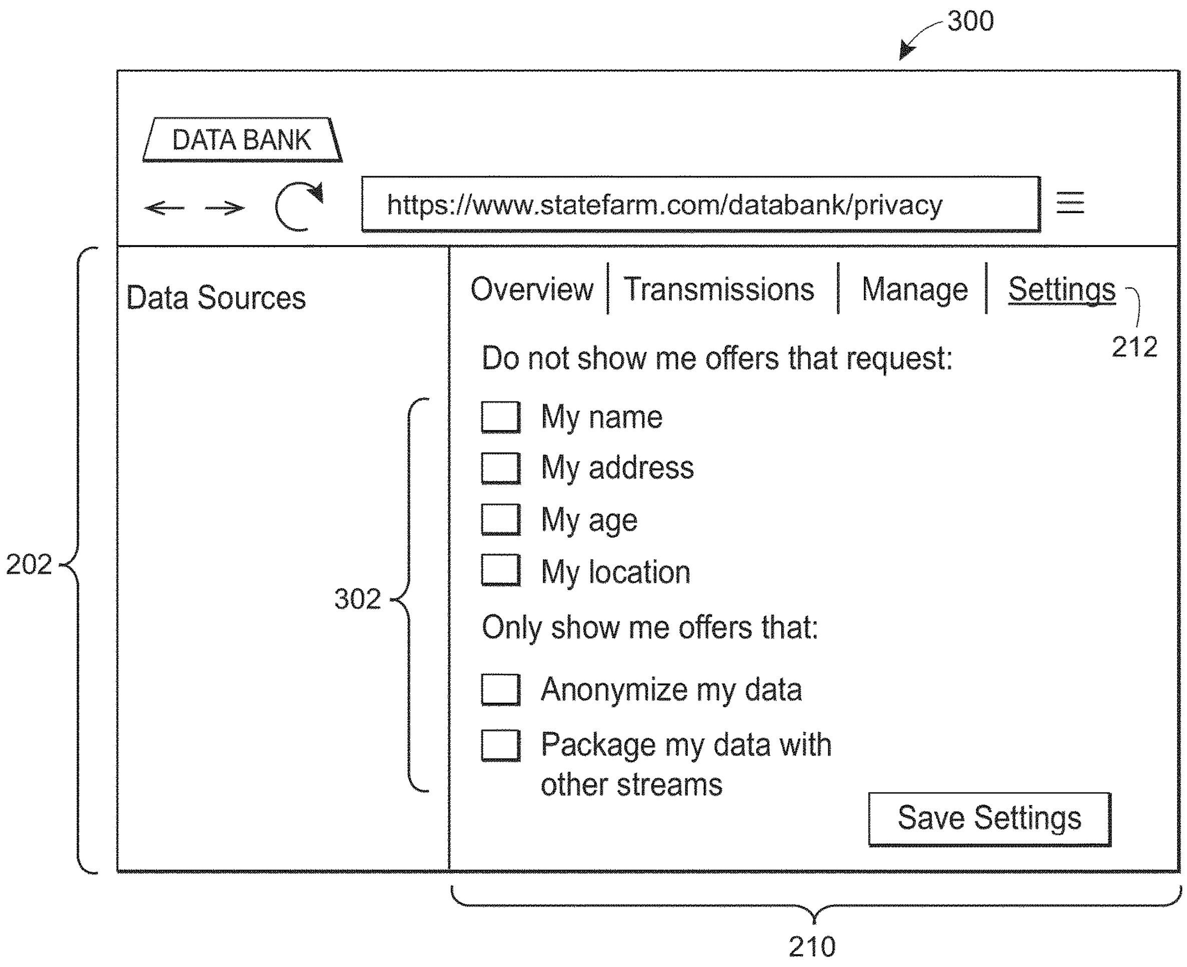
FIG. 3 illustrates a webpage that depicts an exemplary privacy directive submission form displayable by a personal data stream owner's device in accordance with some embodiments.

FIG. 3 illustrates a web page 300 that displays input parameters for an owner's privacy directive. Information window 210 shows checkboxes 302 corresponding to various options for the privacy directive on a privacy screen selected under the settings link on navigation bar 212. In one embodiment, privacy directive options may apply to all of an owner's streams of personal data managed in trusted bank 122 or to selected categories of personal data streams or to individual streams, or any combination thereof.

In one embodiment, the owner may select which streams or categories of streams are handled according to the input privacy directive options by selecting those streams or categories via sidebar 202. Privacy settings may include protection of any selected data pertaining to a data stream by not sharing the selected data with any consumers of personal data. Protected data may include pieces of data from the stream itself or data pertaining to the owner of the stream, such as demographic information, personal information, and/or information from other streams including location information or any other identifying information. An owner may elect to only view incentive offers or participate in incentive deals wherein the protected information is not shared with the consumer of personal data.

The privacy directive serves the purpose of returning control over personal data streams to the owners of those streams. The proliferation of personal data streams in this field may present a problem to consumers of personal data who wish to obtain access to, or assert a degree of control over, personal data streams because owners often are not comfortable sharing identifying information or otherwise surrendering a portion of their privacy to the data consumers. This is particularly problematic where the consumer of personal data also seeks to gain some or all control over the source of the data, such as where a utility may offer an incentive in return for control of a household thermostat. The problem may be compounded because owners have their own unique privacy preferences such that one consumer may bristle where another may simply shrug when considering sharing personal data. The privacy directive addresses this problem by putting the privacy settings in the hands of the owner of the data stream. Web page 300 may include additional, less, or alternate functionality, including that discussed elsewhere herein.

Figure 4:
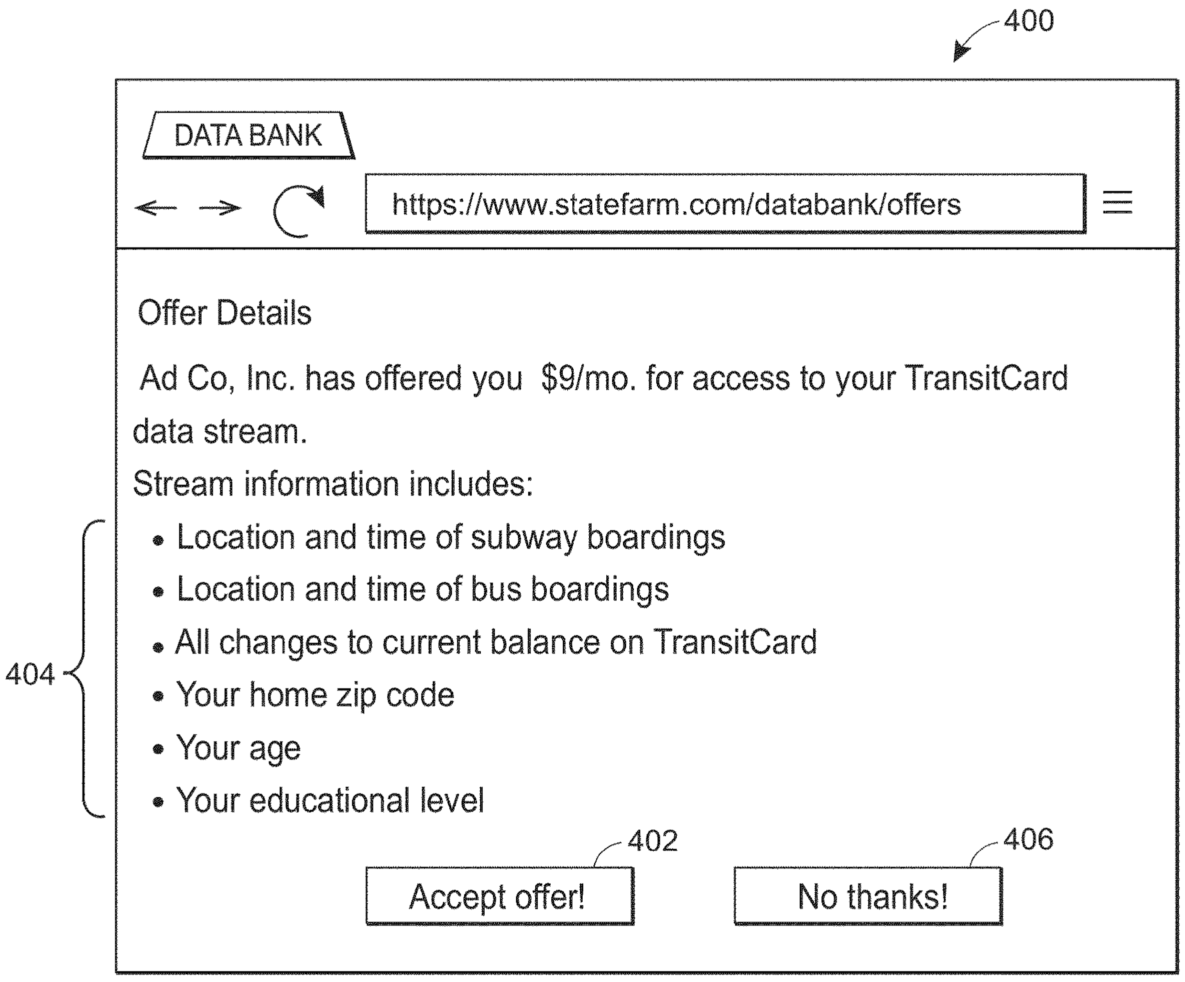
FIG. 4 illustrates a webpage that depicts an exemplary offer details screen displayable by a personal data stream owner's device in accordance with some embodiments.

Exemplary Incentive Offer Details User Interface for Personal Data Stream Owners FIG. 4 illustrates a web page 400 that displays the terms and conditions 404 of an incentive offer presented to an owner of a personal data stream in return for sharing part or all of the data stream with a consumer of personal data. In one embodiment, web page 400 may be presented to an owner after the owner clicks on learn more button 218 as shown in FIG. 2. In other embodiments, web page 400 may be presented to an owner of a personal data stream randomly or in accordance with the owner's matching one or more search criteria specified by the consumer of personal data offering the incentive. The owner may accept or decline the incentive offer using buttons 402 and 406, respectively. Web page 400 may include additional, less, or alternate functionality, including that discussed elsewhere herein.

Exemplary Personal Data Stream Management User Interface

Figure 5:
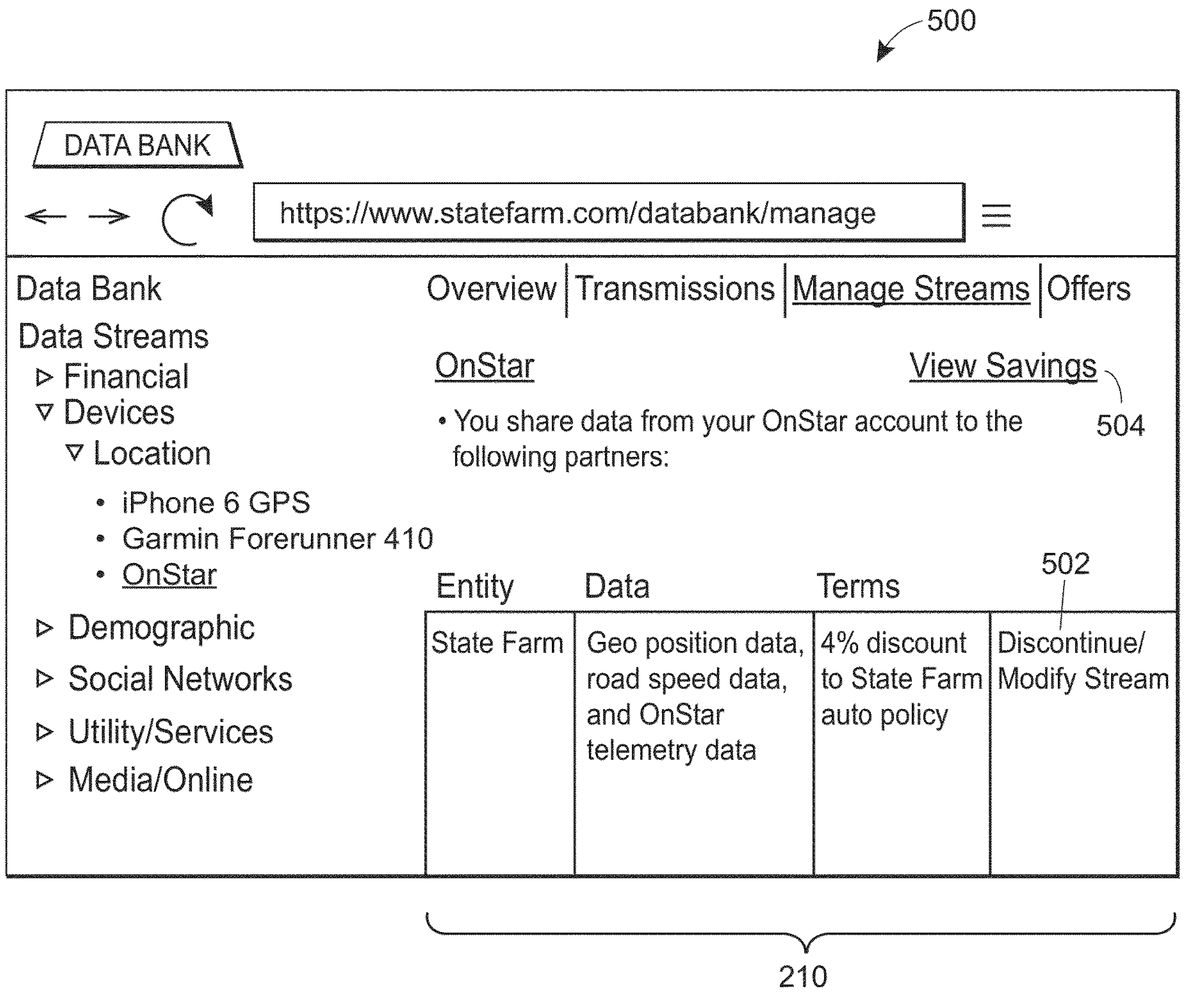
FIG. 5 illustrates a webpage that depicts an exemplary personal data stream management screen displayable by a personal data stream owner's device in accordance with some embodiments.

FIG. 5 illustrates a web page 500 that displays information regarding a previously accepted offer to an owner of the shared stream of personal data in information window 210. In some embodiments, the owner may navigate to web page 500 using navigation bar and sidebar 202. In FIG. 5, the owner of a stream of data originating from an OnStar system and account for use with a vehicle shares data from the stream with an entity, State Farm, according to the terms displayed in information window 210. Information window 502 may include a link for the owner to discontinue or modify the terms of the sharing, such as the privacy directive associated with this stream. In addition to the depicted information windows, the web page 500 may also include a link 504 for the owner to view an amount of money received and/or saved through sharing the stream of personal data originating from the OnStar system.

Figure 6A:
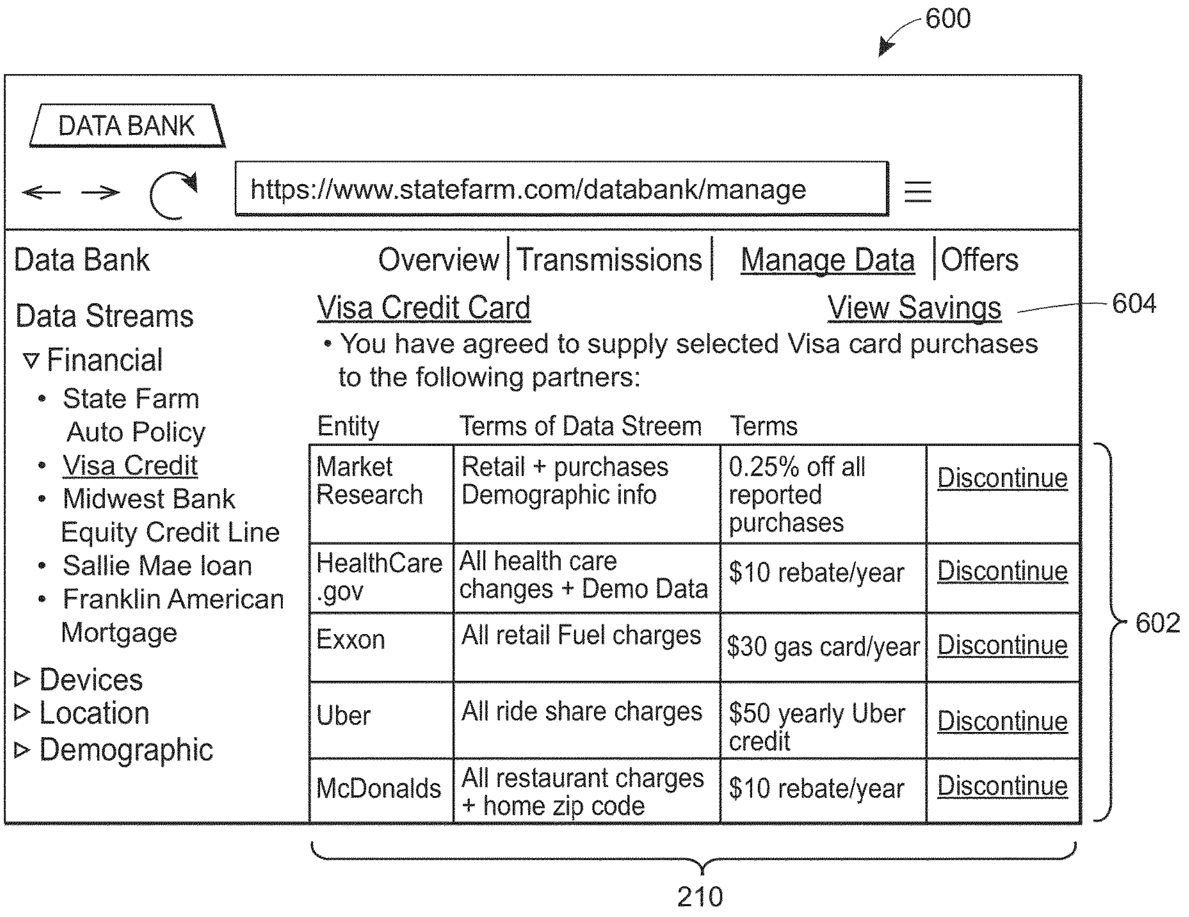
FIG. 6A illustrates a webpage that depicts another exemplary personal data stream management screen displayable by a personal data stream owner's device in accordance with some embodiments.

FIG. 6A illustrates another embodiment of a web page 600 displaying previously accepted offers to an owner of personal data streams. In web page 600, the owner has selected a Visa credit card stream from sidebar 202, and information window 210 displays five consumers of personal data that are sharing the owner's stream with the respective terms and conditions shows. Web page 600 may include discontinue buttons 602 to permit the owner to terminate the respective data stream subscriptions to the consumers of personal data shown in information window 210. In addition to the depicted information windows, the web page 600 may also include a link 604 for the owner to view an amount of money received and/or saved through sharing the stream of personal data originating from the Visa credit card stream.

Figure 6B:
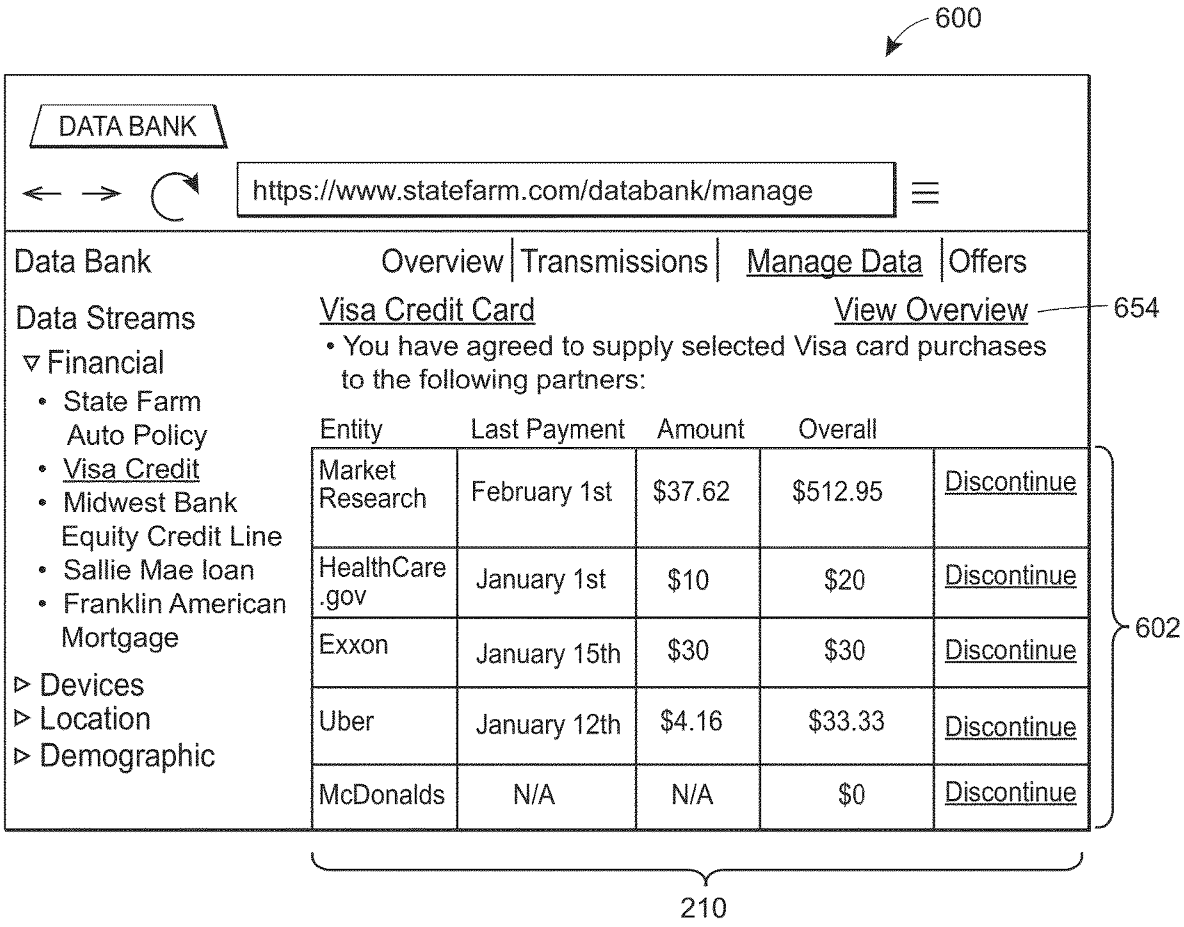
FIG. 6B illustrates a webpage that depicts another exemplary personal data stream management screen displayable by a personal data stream owner's device in accordance with some embodiments

FIG. 6B illustrates an embodiment of a web page 650 displaying a savings summary associated with previously accepted offers to an owner of personal data streams. The web page 650 may be depicted in response to the owner selecting the link 604 on the webpage 600. In the web page 650, the information window 210 may display the same five consumers of personal data that are sharing the owner's stream depicted on the web page 600. However, instead of depicting the respective terms and conditions, the information window 210 may now depict an amount of money received from each consumer. This information may be broken down into a date of last payment, an amount received in the last payment, an overall amount of money received from the consumer, as well as any other relevant information. Web page 650 may include discontinue buttons 602 to permit the owner to terminate the respective data stream subscriptions to the consumers of personal data shown in information window 210. In addition to the depicted information windows, the web page 650 may also include a link 654 for the owner to view the terms and conditions associated with each consumer of personal data, for example, by displaying the web page 600.

Accordingly, the web pages 500, 600, 650 may enable the owner to easily view and track the amount of money received through sharing a stream of personal data. This provides the owner the information to decide whether the sharing of the stream of personal data is worth the financial gain in an easy and readily apparent format. Web pages 500, 600, and 650 may include additional, less, or alternate functionality, such as an option that enables early termination in exchange for a penalty and/or pro-rated fees or benefits, including that discussed elsewhere herein.

Exemplary Personal Data Stream Transaction Log User Interface

Figure 7:
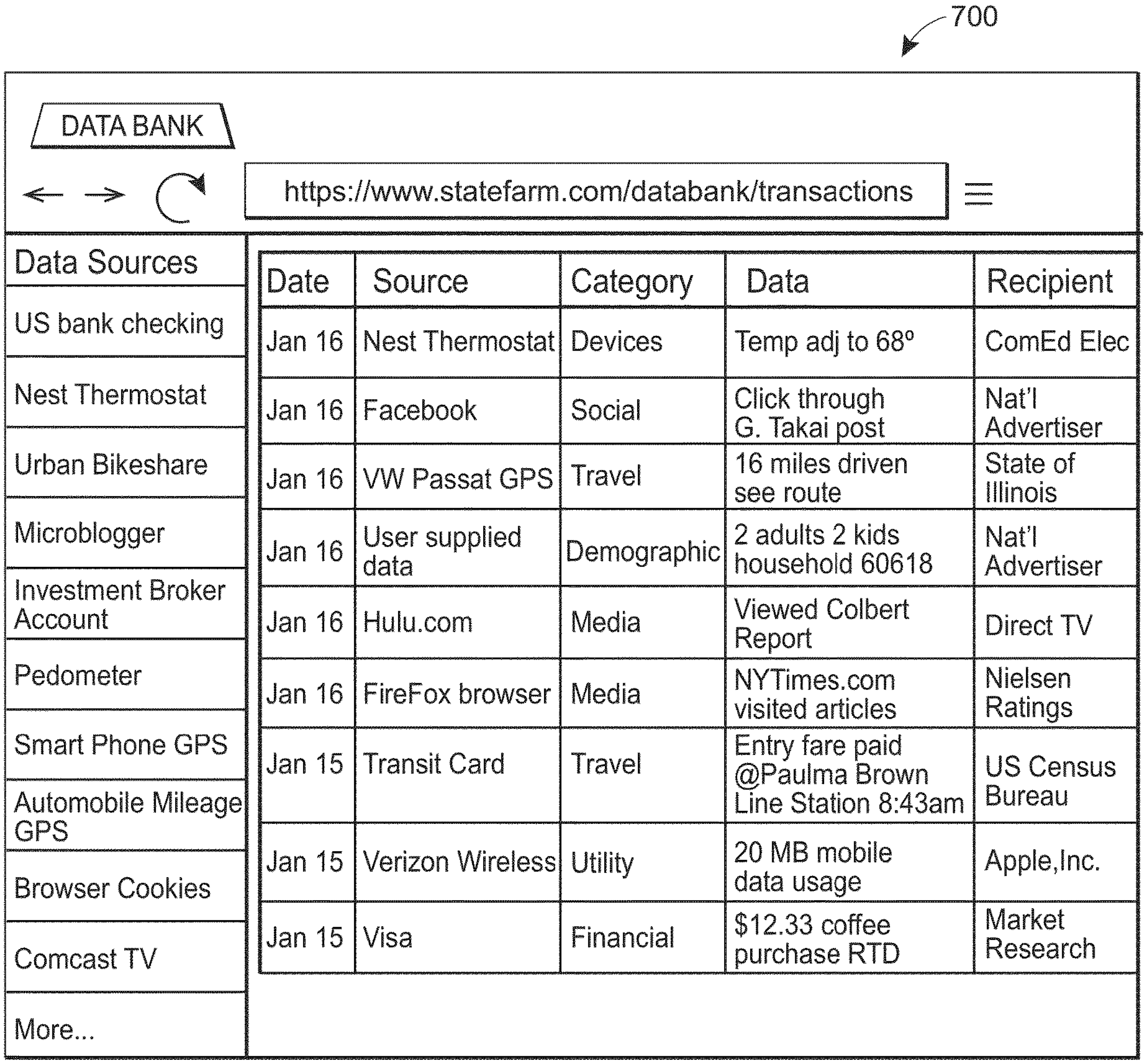
FIG. 7 illustrates a webpage that depicts an exemplary personal data stream recent transactions screen displayable by a personal data stream owner's device in accordance with some embodiments.

FIG. 7 illustrates an exemplary web page 700 that displays a transaction log for an owner of personal data streams showing each discrete piece of information from each stream as it is shared with the consumer of the stream in information window 210. Web page 700 may give the owner of personal data streams managed by trusted data bank 122 an at-a-glance view of all information as it leaves the bank and is sent to consumers of personal data in real time. This view is useful for an owner of personal data streams to keep tabs on the type of information he or she is sharing, and will alert them to the sharing of any unwanted personal data or identifying information that they may no longer wish to share.

For example, an owner of personal data streams may have agreed to share location-based data from his automobile without appreciating the scope of the information shared and its ability to reveal private information. Upon seeing the actual data and its recipients, the owner may change his mind regarding the terms of the sharing agreement or may wish to modify those terms.

Web page 700 is consistent with the trusted data bank's principle of putting control over personal data streams in the hands of the owners of those streams, and supplying the owners with the tools needed to efficiently manage the content of the streams and to continuously monitor privacy by revealing the terms and conditions of the owner's accepted sharing agreements and the data transmitted to third parties pursuant to those agreements. Web page 700 may include additional, less, or alternate functionality, including that discussed elsewhere herein.

Exemplary Personal Data Stream Search User Interface

Figure 8:
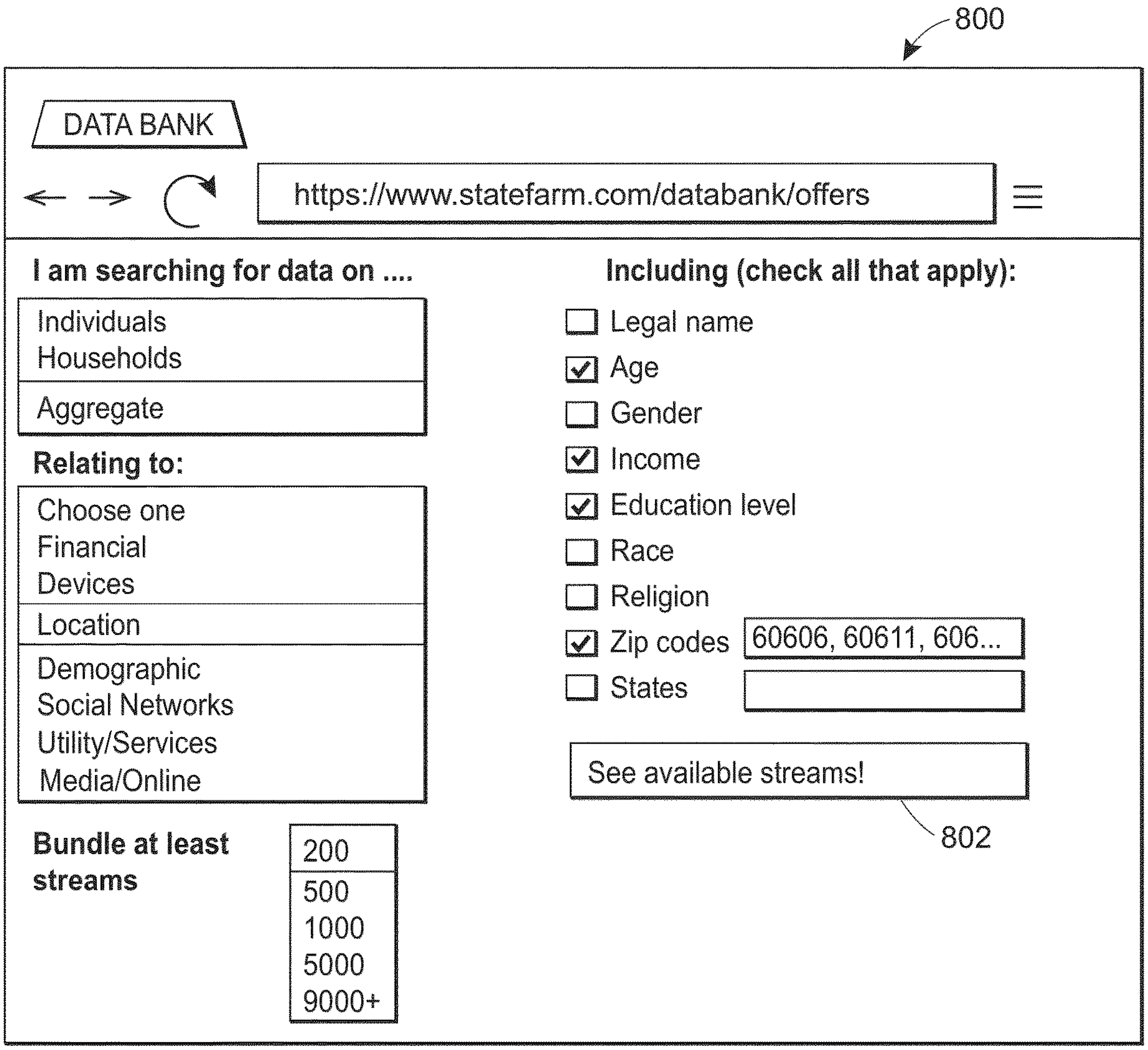
FIG. 8 illustrates a webpage that depicts an exemplary personal data criteria screen displayable by a personal data stream consumer's device in accordance with some embodiments.

FIG. 8 illustrates an exemplary web page 800 for accepting search criteria from consumers of personal data streams. Web page 800 may include an entity field for searching for data streams relating to individuals, households, or aggregate bundles of streams. Individual data may originate from devices such as wearables that relate to a single individual. Household data streams may relate to household appliances that are used by all individuals living in a single dwelling, and aggregate bundles of streams may be grouped according to other criteria such as the income, age, relationship status, or educational level of the owners, among other criteria.

Web page 800 may include a personal data category list for choosing data streams according to categories such as financial, devices, location-based, demographic, social networks, utilities/services, and/or media/online. Other categories are also envisioned in other embodiments.

Web page 800 may further include check boxes to specify certain pieces of information in the streams that the consumer of personal data wishes to include in results. This list may assist the consumers of personal data in filtering potential personal data streams to ensure that desired data is included. For example, a company that wishes to collect personal data to analyze usage or activity patterns according to an individual's age may not be interested in offering incentives to personal data stream owners who have elected not to share their age information with personal data stream consumers. By checking the age box on web page 800, the consumer of personal data may ensure its search results only include streams that reveal the owners' ages, in accordance with its desire to analyze activities according to age.

Web page 800 may further include a bundle size picker to allow consumers of personal data to include a minimum number of streams, for example, when the consumer wishes to offer incentives only for streams of personal data that comprise a statistically significant sample for analysis. Submit button 802 may permit the searcher to submit its entered criteria and view potential matches. Web page 800 may include additional, less, or alternate functionality, including that discussed elsewhere herein.

Exemplary Personal Data Stream Auction User Interface

Figure 9:
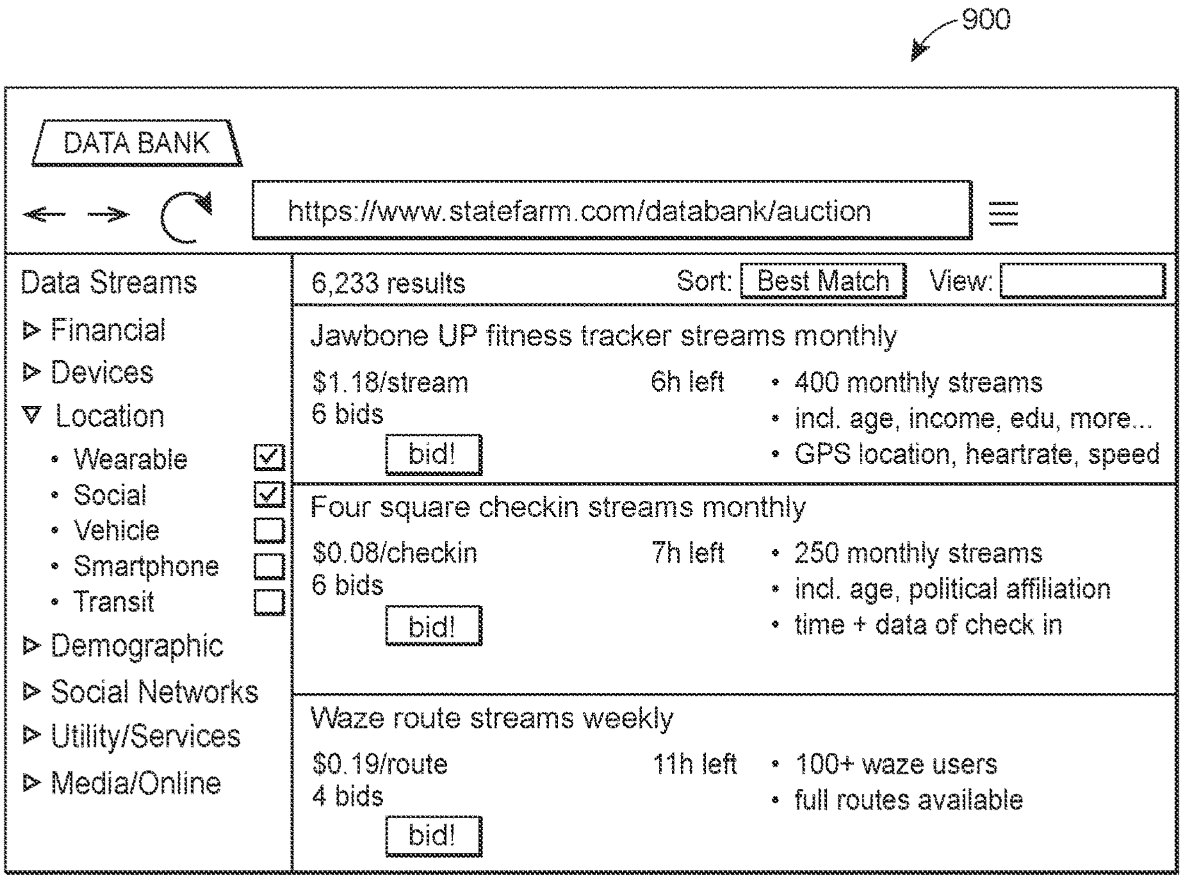
FIG. 9 illustrates a webpage that depicts an exemplary personal data auction screen displayable by a personal data stream consumer's device in accordance with some embodiments.

FIG. 9 illustrates an exemplary web page 900 for displaying data streams matching a search by a potential consumer of personal data according to submitted search criteria. In one embodiment, the matching data streams may be presented in the form of an auction in which any interested consumers of personal data may bid on streams, with access awarded to the highest bidder. It should be appreciated that, in addition to the highest bidder, access to a data stream may be awarded to any number of bidders that had bid above a threshold price. Accordingly, when access to data stream is auctioned, there may be an indication of whether the auction is for exclusive or non-exclusive access to the data stream. As a result, the consumers of personal data may adjust their bids based on the exclusivity of access. In other embodiments, matching personal data streams may be presented individually, with fixed prices, with prices varying according to demand for the streams, the amount of consumers that may simultaneously have access to the stream, an amount paid for a similar data stream, and/or according to any other metric.

In FIG. 9, the matching stream data are shown in the form of aggregated streams matching search criteria. Each auction offer may include associated terms and conditions. In one embodiment, consumers of personal data may browse available personal data streams via sidebar 202 and associated checkboxes. In other embodiments, consumers of personal data may make and offer customized incentive offers directed at individual owners of personal data streams.

Exemplary Method

Figure 10:
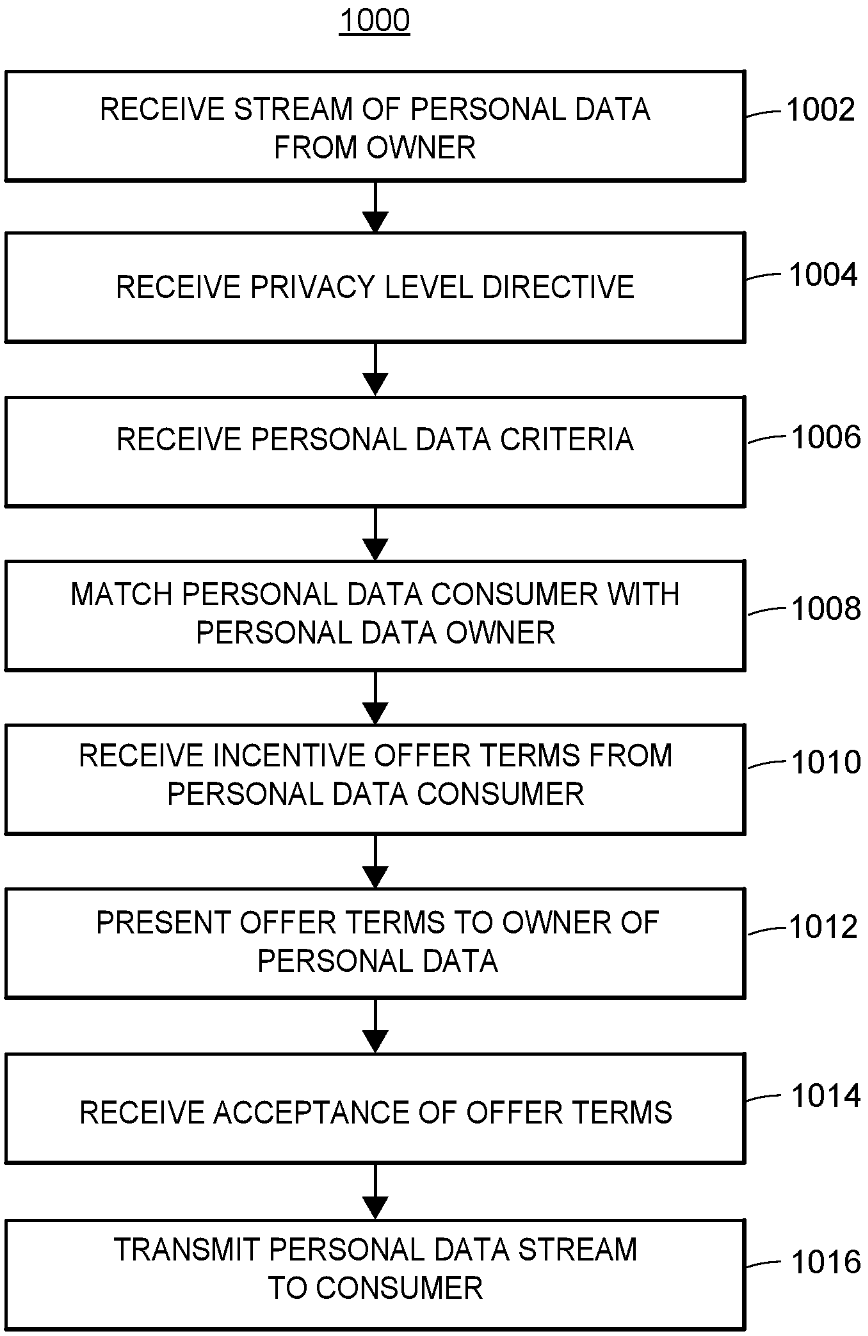
FIG. 10 is an exemplary flow diagram associated with a trusted personal data bank managing and sharing personal data streams on behalf of an owner of the data with a consumer of the data.

An exemplary method 1000 according to some embodiments is shown in FIG. 10. Receipt of a stream of personal data from an owner may occur at step 1002. Receipt of a stream of personal data may be done in a variety of ways.

For example, an owner may supply login credentials, such as a user name and password, to allow the recipient to access the data stream. In another embodiment, the owner may add the recipient to a whitelist on a device to allow the recipient to access the data stream in real time as it is being created. In yet another embodiment, the data stream may be uploaded to a web site or server. In yet another embodiment, the data stream may be sent using either a push or a pull protocol, a polling protocol, and may further include a sync step to account for pieces of the data stream created before step 1002.

At step 1004, receipt is made of a privacy level directive specified by the owner of a personal data stream. The privacy level directive may require the sanitization of the stream of personal data to remove any pieces that do not comply with the privacy directive. Sanitization of the stream of personal data may include, for example, parsing the stream of personal data for any pieces that do not comply with the owner's privacy directive, flagging each scanned piece of data in the stream that does not comply with the owner's privacy directive, and continuing scanning until the end of the stream has been reached. Steps of sanitation may further include creating a new sanitized stream of personal data by sequentially copying all non-flagged pieces of data from the stream into a new stream that forms the sanitized stream, and/or transferring the sanitized stream to any appropriate consumers of the personal data. As another example, sanitization may include redacting any data that does not comply with the privacy directive. The resulting sanitized data stream may be considered a shareable personal data stream.

At step 1006, receipt is made of personal data criteria from a potential consumer of personal data streams. The criteria may include any subset of the data and any subset of data identifying or describing the owner of the data stream. At step 1008, candidate personal data streams are matched with criteria received in step 1006 based at least in part on the associated privacy directives of those personal data streams. At step 1010, receipt is made of an incentive offer from the consumer of personal data for access to personal data streams according to terms and conditions specified by the offeror. For example, the consumer of personal data may only be interested in personal data streams that have not been sanitized to remove certain demographic information or information pertaining to the owner's activities. At step 1012, the terms of the incentive offer are presented to a matched owner of a personal data stream.

Once the owner of a personal data stream has received incentive terms, he may grant access to the data stream according to those terms by accepting the terms at step 1014. Once accepted, the personal data stream may be transmitted at step 1016 pursuant to any sanitation required by the owner's privacy directive. The stream may be transmitted to the consumer in a single block representing past activity on the stream, as future pieces of the stream are generated, or in any combination thereof. It should be appreciated that at any point after granting access, the owner of the personal data stream may revoke access to the consumer, such the revocation of access causes the previously granted access to be terminated. The method 1000 may include additional, less, or alternate actions, including those discussed elsewhere herein.

Exemplary Embodiments

In one aspect, a computer-implemented method of operating a data bank of personal data may be provided. The method may include, with the permission or affirmative consent of an owner of personal data, (1) receiving a stream of personal data corresponding to the owner of the personal data; (2) receiving, from the owner of the personal data, a privacy level directive corresponding to the stream of personal data, the privacy level directive identifying at least one category of non-sharable data in the stream of personal data; (3) receiving, from a personal data consumer, a set of personal data criteria; (4) in accordance with the personal data criteria and the privacy level directive, matching, via one or more processors, the personal data consumer with the stream of personal data; (5) receiving, from the personal data consumer, offer terms; and/or (6) presenting, via the one or more processors, the offer terms, to the owner of the personal data, to facilitate operating a data bank of personal data and/or receiving offers for access to personal data. The method may include additional, less, or alternate functionality, including that discussed elsewhere herein.

For instance, matching the personal data consumer with the personal data may include (1) redacting, via the one or more processors, the at least one category of non-sharable data from the stream of personal data to generate a sharable personal data stream; and/or (2) matching, via the one or more processors, the personal data consumer with the shareable personal data stream.

The method may also include (1) receiving, from the owner of the personal data, an acceptance of the offer terms; and/or (2) granting, via the one or more processors, the consumer of personal data access to the stream of personal data.

After granting access to the stream of personal data, the method may also include (1) receiving, from the owner of the personal data, an indication that permission for the consumer of personal data to access the stream of personal data has been revoked; and/or (2) terminating, via the one or more processors, the access of the consumer of personal data to the stream of personal data.

Granting the consumer of personal data access to the stream of personal data may include granting, via the one or more processors, the consumer of personal data at least one of a right to view the stream of personal data and/or a right to control a source of the stream of personal data.

Receiving the stream of personal data may include receiving personal data related to (1) at least one of finances, education, utility usage, shopping and/or spending habits, activities, hobbies, commercial transactions, social networks, media preferences, telematics data, interconnected home data, insurance-related information, and/or smart or autonomous vehicle data; and/or (2) a family which includes the owner of the personal data.

Receiving the offer terms may include (1) receiving, from a plurality of consumers of personal data, a plurality of bids to purchase the stream of personal data; (2) sending, to the owner of the personal data, the plurality of bids; and/or (3) receiving, from the owner of the personal data, an indication of a set of winning bids of the plurality of bids, the set of winning bids corresponding to the offer terms.

In another aspect, a computer-implemented method of granting access to personal data streams may be provided. The method may include, a user's permission or affirmative consent, (1) establishing, via one or more processors, a data bank account for a user, the data bank account managing access to a plurality of personal data streams for the user; (2) receiving, via the one or more processors, a user selection of a type of personal data streams to deposit in the data bank account; (3) receiving, via the one or more processors, permission from the user to grant access to one or more of the deposited personal data streams to a third party end-user to complete a personal data-related transaction between the third party end-user and the user; (4) responsive to receiving the permission, granting, via the one or more processors, access to the one or more of the deposited personal data streams to the third party end-user; and/or (5) updating, via the one or more processors, a display of personal data-related transactions to include an indication of the completed personal data-related transaction to facilitate the user monitoring and controlling their personal data and/or personal data stream transactions. The method may include additional, less, or alternate actions, including those discussed elsewhere herein.

For instance, receiving the user selection of the type of personal data streams may include receiving, via the one or more processors, a user selection of a type of personal data within a personal data stream of the plurality of personal data streams to deposit in the data bank account.

Receiving permission from the user to grant access to one or more of the deposited personal data streams may include receiving, via the one or more processors, one or more conditions from the user characterizing how one or more of the deposited personal data streams are shared with one or more third party entities or merchants.

Receiving the one or more conditions may include receiving, via the one or more processors, one or more conditions indicating a type of data security precautions to secure the deposited personal data streams, an amount and/or type of personal information to share, a type of third party end-user with which to share the personal information, and/or a duration the personal information will be shared.

The method may include generating, via the one or more processors, a user interface to display a plurality of indications corresponding to the one or more deposited personal data streams.

Generating the user interface may include (1) for each of the one or more deposited personal data streams, displaying, via the one or more processors, a set of transactions associated with a respective deposited personal data stream, wherein displaying the transaction includes displaying an indication of a third party end-user with access to at least a portion of the deposited personal data stream; and/or (2) for each of the one or more deposited personal data streams, generating, via the one or more processors, a respective user interface element that, when selected, causes the respective deposited data stream to be removed from the data bank account.

The method may include (1) receiving, from another third party end-user, a signal indicating activation of an access purchase opportunity; (2) automatically identifying, via the one or more processors, a personal data stream of the one or more deposited personal data streams matching the activated purchase opportunity, the matching based upon an analysis of personal information associated with the user; and/or (3) in response to identification, generating, via the one or more processors, an indication notifying the user to the activated purchase opportunity.

The method may include (1) transmitting, to the user, the indication; and/or (2) responsive to transmitting the indication, receiving, from the user, an acceptance, approval, or modification of the activated purchase opportunity.

In another aspect, a computer-implemented method of managing access to streams of personal data may be provided. The method may include, with the user's permission or affirmative consent, (1) receiving a stream of personal data owned by the user, the stream of personal data including data generated by the user and data pertaining to an identity of the user; (2) receiving, from the user, a privacy level directive for the stream of personal data identifying at least one category of non-sharable data in the stream; (3) in accordance with the privacy level directive, redacting the at least one category of non-sharable data from the stream to generate a sharable personal data stream; (4) receiving, from the user, an indication of permission to grant access to the shareable personal data stream to a consumer of personal data; and/or (5) granting, to the consumer of personal data, access to the sharable personal data steam to facilitate managing access to personal data. The method may include additional, less, or alternate actions, including those discussed elsewhere herein.

For instance, the method may include (1) receiving, from the user, an indication that permission to access the shareable personal data stream has been revoked; and (2) terminating the access of the consumer of personal data to the shareable personal data stream.

The data generated by the user may include data generated by a household appliance, transactions in a financial account, a wearable device, use of public transportation, a global positioning system, or an internet browser.

Exemplary Methods of Controlling Access to Personal Data

In one aspect, a computer-implemented method of granting access to personal data and/or personal data streams may be provided. The method may include, with an individual's (or family's) permission or affirmative consent, (1) receiving personal data for an individual (or family), at or by one or more processors (such as processors or servers associated with a financial or insurance provider), via one or more personal data streams associated with the individual; (2) generating, via the one or more processors, a personal data bank account for the individual, the personal data bank account holding the personal data and/or access to the one or more personal data streams; (3) receiving, via the one or more processors, bids for the personal data of the individual and/or for access to the one or more personal data streams associated with the individual, the bids being electronically submitted from third party (personal data) end-users; (4) pushing the bids received, via the one or more processors, to the individual for their review; (5) receiving an acceptance of a winning bid from the individual, via the one or more processors; and/or (6) granting access to the personal data of the individual and/or the one or more personal data streams associated with the individual, via the one or more processors, to facilitate allowing the individual to complete personal data-related transactions with third party (personal data) end-users. The method may include generating, via the one or more processors, a user interface for presentation to the individual via their mobile device that summarizes or tracks all of the individual's personal data transactions associated with their personal data bank account for a given period of time to facilitate the individual managing their personal data and/or personal data streams, and/or controlling the access thereto. The method may include additional, less, or alternate actions, including those discussed elsewhere herein.

In another aspect, a computer-implemented method of granting access to personal data and/or personal data streams may be provided. The method may include (1) receiving, via one or more processors (such as processors or servers associated with a financial or insurance provider), permission from a customer to offer to share personal data with, and/or grant access to one or more personal data streams to, one or more third party (personal data) end-users; (2) collecting, via the one or more processors, personal data of the customer via the one or more personal data streams and/or creating a personal data bank account associated with the personal data collected and/or one or more personal data streams; (3) offering, via the one or more processors, for sale access to (i) the personal data collected; and/or (ii) the one or more personal data streams of the customer; (4) receiving, via the one or more processors, one or more bids from third party data end-users for the access; (5) sending, via the one or more processors, the one or more bids to the customer for their review; (6) receiving, via the one or more processors, a winning bid from the customer; and/or (7) granting access or otherwise sharing, via the one or more processors, access to (i) the personal data collected; and/or (ii) personal data streams of the customer to the third party end-user(s) that submitted the winning bid(s) to facilitate individuals managing and/or controlling which entities have access to their personal data. The method may also include generating, via the one or more processors, a user interface for presentation to the individual via their mobile device that summarizes or tracks all of the individual's personal data transactions associated with their personal data bank account for a given period of time. The method may include additional, less, or alternative actions, including those discussed elsewhere herein.

In another aspect, a computer-implemented method of granting access to personal data and/or personal data streams may be provided. The method may include (1) establishing, via one or more processors (such as processors or servers associated with a financial or insurance provider), a data bank account for a user, the data bank account holding personal data of the user and/or access to personal data streams of the user; (2) allowing, via the one or more processors, the user to remotely select a type of personal data and/or type of personal data stream to deposit in their data bank account; (3) allowing, via the one or more processors, the user to remotely select one or more third party data end-users with which to share or grant access to their personal data and/or personal data streams; (4) presenting, via the one or more processors, a user interface summary of personal data transactions between the user and all third party end-users (or otherwise associated with the data bank account) for a given period of time (e.g., a monthly statement) to facilitate the user monitoring and controlling their personal data and/or personal data stream transactions. The method may also include (5) pushing bids, via the one or more processors, to the user for access to their personal data and/or personal data streams by the third party data end-users. The method may include additional, less, or alternate actions, including those discussed elsewhere herein.

In yet another aspect, a computer-implemented method of granting access to personal data and/or personal data streams may be provided. The method may include (1) generating, via one or more processors (such as processors or servers associated with a financial or insurance provider), a data bank account for a user, the data bank account holding personal data and/or access to multiple personal data streams associated with the user; (2) receiving, via the one or more processors, permission from the user to grant access to their personal data and/or one or more of the multiple personal data streams to one or more third parties to complete one or more personal data-related transactions between the one or more third parties and the user; (3) granting, via the one or more processors, access to the personal data and/or one or more of the multiple personal data streams to the one or more third parties in response to receiving the user's permission; and/or (4) displaying, via the one or more processors, an electronic summary of the data bank account of the user showing all of the personal data transactions associated with the data bank account (and/or showing all personal data transactions between the user and third parties) within a given period to facilitate a user monitoring and controlling access to their personal data and/or personal data streams. The method may also include (5) pushing bids, via the one or more processors, to the user for third party end-user access to their personal data and/or personal data streams. The method may include additional, less, or alternate actions, including those discussed elsewhere herein.

For instance, for the four foregoing methods, the personal data and/or personal data streams may be related to finances, education, utility usage, shopping habits, activities, hobbies, and/or commercial transactions associated with the individual or a family. The personal data streams may be related to financial or utility accounts, social networks, media preferences, online activities, or commercial transactions or spending habits. The personal data may be related to telematics data, interconnected home data, and/or insurance-related information. Additionally or alternatively, the personal data streams may be related to or including telematics data, interconnected home data, smart or autonomous vehicle data, and/or insurance-related information or activities.

Exemplary Methods of Providing Targeted Offers

In one aspect, a computer-implemented method of granting access to personal data and/or personal data streams (and/or providing data-related offers or incentives to an individual or family) may be provided. The method may include (1) gathering, via one or more processors, personal information associated with an individual or family, such as via one or more different types of personal data streams; (2) receiving, via the one or more processors, permission from the individual or family to share the personal information with, and/or grant access to their personal data streams to, one or more third party entities or merchants; (3) receiving, via the one or more processors, one or more conditions from the individual or family on how the personal information is shared with, or accessed by, the one or more third party entities or merchants; (4) once the permission and/or one or more conditions are received, sharing or transmitting the personal information, via the one or more processors and/or the personal data streams, to one or more computing devices associated with the one or more third party entities or merchants; (5) receiving, via the one or more processors, one or more targeted offers from the one or more computing devices associated with the one or more third party entities or merchants, respectively, the one or more targeted offers being for products or services that are targeting the individual or family based upon their personal information; and/or (6) presenting, via the one or more processors, the one or more targeted offers on a computing or mobile device of the individual or family to facilitate completion of commercial transactions tailored to the individual or family based upon consensual computer analysis of their personal information. The method may include additional, less, or alternate actions, including that discussed elsewhere herein.

For instance, the method may include receiving, via the one or more processors, an acceptance, approval, or modification of the one or more targeted offers from the individual or family, or from their computing or mobile device. The personal information and/or personal data streams may be related to finances, education, utility usage, shopping habits, activities, life style, and/or commercial transactions associated with the individual or family. Additionally or alternatively, the personal information and/or personal data streams may be related to telematics data, interconnected home data, and/or insurance-related information.

Sharing or transmitting the personal information, via the one or more processors, to one or more computing devices associated with the one or more third party entities or merchants may be performed via and/or after an online auction associated with offering for sale access to the personal information. The permission received from the individual or family may indicate a willingness to share some or all of their personal information electronically collected, and/or personal data stream access, in exchange for receiving benefits and/or tailored offers for products or services based upon computer analysis of their personal information (such as analysis of likes, dislikes, activities, habits, hobbies, life style, normal vehicle or utility usage, unmet needs, etc.).

The one or more conditions received from the individual or family may indicate what type of data security precautions to take with the data, an amount and/or type of personal information to share (e.g., medical, financial, vehicle usage, merchant preferences, telematics data, etc.), which type of personal data stream to grant access to, which type of entities or merchants to share the personal information or personal data streams with, and/or how long to share the personal information or grant access to a personal data stream. The one or more targeted offers tailored to the individual or family based upon consensual computer analysis of their personal information includes offers for: financial, vehicle, home, and/or insurance-related products or services.

In another aspect, a computer-implemented method of granting access to personal data and/or personal data streams (and/or providing offers or completing financial or commercial transactions) may be provided. The method may include (1) receiving, via one or more processors, permission from an individual or family to collect and/or share their personal information and/or personal data streams with one or more third party entities or merchants; (2) receiving, via the one or more processors, one or more conditions from the individual or family on how, or the extent that, the personal information is, or personal data streams are, to be shared with the one or more third party entities or merchants; (3) once the permission and/or one or more conditions are received, gathering or collecting, via one or more processors and/or streams of personal data, personal information associated with the individual or family; (4) then sharing or transmitting the personal information, via the one or more processors, to one or more computing devices associated with the one or more third party entities or merchants; (5) receiving, via the one or more processors, one or more targeted offers from the one or more computing devices associated with the one or more third party entities or merchants, respectively, the one or more targeted offers being for products or services that are targeting the individual or family based upon their personal information; and/or (6) presenting, via the one or more processors, the one or more targeted offers to the individual or family to facilitate completion of commercial transactions tailored to the individual or family based upon consensual computer analysis of their personal information. The method may include additional, less, or alternate actions, including those discussed elsewhere herein.

For instance, the personal information may be related to finances, education, utility usage, shopping habits, activities, hobbies, and/or commercial transactions associated with the individual or family. The method may further include receiving, via the one or more processors, an acceptance, approval, or modification of the one or more targeted offers from the individual or family, or from their computing or mobile device.

The personal data streams may be related to financial or utility accounts, social networks, media preferences, online activities, and/or commercial transactions or spending habits. The personal information may be related to telematics data, interconnected home data, and/or insurance-related information. The personal data streams may be related to or including telematics data, interconnected home data, smart or autonomous vehicle data, and/or insurance-related information or activities. The one or more targeted offers tailored to the individual or family based upon consensual computer analysis of their personal information may include offers for: financial, vehicle, home, medical, dining, clothing, and/or insurance-related products or services.

Exemplary Server

Figure 11:
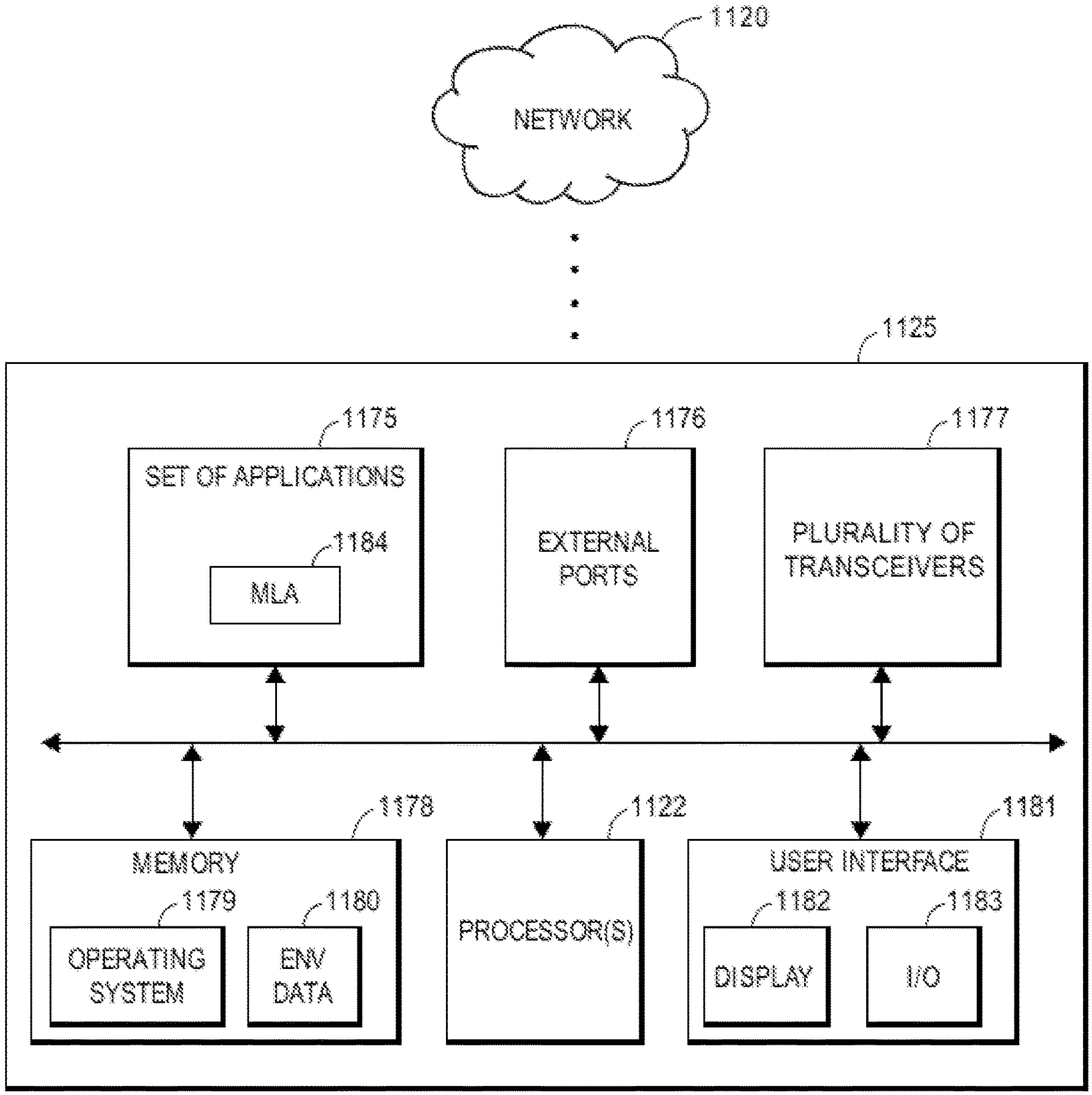
FIG. 11 is a block diagram of an exemplary hardware server in accordance with some embodiments.

FIG. 11 illustrates a diagram of an exemplary hardware server 1125 (such as the hardware server 124 as discussed with respect to FIG. 1) in which the functionalities as discussed herein may be implemented. It should be appreciated that the hardware server 1125 may be associated with an insurance provider, as discussed herein.

The hardware server 1125 may include a processor 1122 as well as a memory 1178. The memory 1178 may store an operating system 1179 capable of facilitating the functionalities as described herein. The hardware server 1125 may also store a set of applications 1175 (i.e, machine readable instructions). For example, one of the set of applications 1175 may be a machine learning algorithm (MLA) 1184 configured to manage and organize access to personal data streams. It should be appreciated that other applications are envisioned.

The processor 1122 may interface with the memory 1178 to execute the operating system 1179 and the set of applications 1175. The machine learning algorithm 1184 may access the environment data 1180 to manage and organize access to personal data streams. The memory 1178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The hardware server 1125 may further include a communication module 1177 configured to communicate data via one or more networks 1120. According to some embodiments, the communication module 1177 can include one or more transceivers (e.g., WWAN, WLAN, and/or WPAN transceivers) functioning in accordance with IEEE standards, 3GPP standards, or other standards, and configured to receive and transmit data via one or more external ports 1176. For example, the communication module 1177 may send, via the network 1120, a notification to an owner or consumer of personal data regarding the status of one or more owned or shared personal data streams.

The hardware server 1125 may further include a user interface 1181 configured to present information to a user and/or receive inputs from the user. As shown in FIG. 11, the user interface 1181 may include a display screen 1182 and I/O components 1183 (e.g., ports, capacitive or resistive touch sensitive input panels, keys, buttons, lights, LEDs, speakers, microphones).

According to the present embodiments, the user may access the hardware server 1125 via the user interface 1181 to process or update the environment data and/or perform other functions. In some embodiments, the hardware server 1125 may perform the functionalities as discussed herein as part of a "cloud" network or can otherwise communicate with other hardware or software components within the cloud to send, retrieve, or otherwise analyze data.

The hardware server 1125 may be a local or remote server. For instance, the hardware server 1125 may be a remote server such as a cloud server. Additionally or alternatively, the hardware server 1125 may be located on the source of the personal data. Other servers may be used.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 1122 (e.g., working in connection with the operating system 1179) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of operating a data bank of personal data, the method comprising:

receiving a stream of personal data from one or more smart devices, the stream of personal data corresponding to an owner of the personal data;

receiving, at one or more processors from the owner of the personal data, first and second privacy level directives corresponding to the stream of personal data;

notifying, via an indication from the one or more processors, the owner of the personal data of an activated purchase opportunity by one or more consumers of personal data based upon the personal data;

receiving, at the one or more processors from the one or more consumers of personal data, one or more bids associated with first offer terms;

causing, by the one or more processors, an indication of the one or more bids to be presented to the owner of the personal data;

receiving, at the one or more processors from the owner of the personal data, an indication of an acceptance of a set of winning bids of the one or more bids, each of the winning bids corresponding to the first offer terms and being associated with a winning personal data consumer of the one or more consumers of personal data;

causing, via the one or more processors, the stream of personal data to be sanitized according to the first privacy level directive to create a first sanitized stream of personal data by parsing the stream of personal data into a plurality of data segments, flagging each data segment that does not comply with the first privacy level directive, and redacting each flagged data segment in the first sanitized stream by copying each non-flagged data segment into the first sanitized stream and not copying each flagged data segment, such that the first sanitized stream consists of a plurality of non-flagged data segments copied from the stream of personal data; and granting, via the one or more processors, each winning personal data consumer access to the first sanitized stream of personal data.

2. The computer-implemented method of claim 1, wherein the one or more smart devices comprise at least one wearable device.

3. The computer-implemented method of claim 1, wherein the one or more smart devices comprise a plurality of Internet of Things (IoT) devices.

4. The computer-implemented method of claim 1, wherein the one or more smart devices comprise at least one smart home appliance.

5. The computer-implemented method of claim 1, wherein receiving the stream of personal data further comprises:

receiving personal data related to at least one of finances, education, utility usage, shopping or spending habits, activities, hobbies, commercial transactions, social networks, media preferences, telematics data, interconnected home data, insurance-related information, or smart or autonomous vehicle data.

6. The computer-implemented method of claim 1, wherein receiving the stream of personal data further comprises:

receiving personal data related to a family which includes the owner of the personal data.

7. The computer-implemented method of claim 1, further comprising:

receiving, at the one or more processors from the owner of the personal data, an additional indication of acceptance of an additional bid from a second personal data consumer of the one or more consumers of personal data, the additional bid being associated with the second privacy level directive;

causing, via the one or more processors, the stream of personal data to be sanitized according to the second privacy level directive to create a second sanitized stream of personal data; and granting, via the one or more processors, the second personal data consumer access to the second sanitized stream of personal data.

8. The computer-implemented method of claim 1, wherein granting each winning personal data consumer access to the first sanitized stream of personal data further comprises:

granting, via the one or more processors, the respective winning personal data consumer at least one of a right to view the first sanitized stream of personal data or a right to control a source of the first sanitized stream of personal data.

9. The computer-implemented method of claim 1, further comprising:

after granting access to the first sanitized stream of personal data, receiving, from the owner of the personal data, an indication that permission for at least one winning personal data consumer to access the first sanitized stream of personal data has been revoked; and terminating, via the one or more processors, the access of the at least one winning personal data consumer to the first sanitized stream of personal data.

10. A system for operating a data bank of personal data, comprising:

one or more processors; and one or more tangible, non-transitory memories communicatively connected to the one or more processors and storing computer-executable instructions that, when executed by the one or more processors, cause the system to:

receive a stream of personal data from one or more smart devices, the stream of personal data corresponding to an owner of the personal data;

receive, from the owner of the personal data, first and second privacy level directives corresponding to the stream of personal data;

notify, via an indication, the owner of the personal data of an activated purchase opportunity by one or more consumers of personal data based upon the personal data;

receive, from the one or more consumers of personal data, one or more bids associated with first offer terms;

cause an indication of the one or more bids to be presented to the owner of the personal data;

receive, from the owner of the personal data, an indication of an acceptance of a set of winning bids of the one or more bids, each of the winning bids corresponding to the first offer terms and being associated with a winning personal data consumer of the one or more consumers of personal data;

cause the stream of personal data to be sanitized according to the first privacy level directive to create a first sanitized stream of personal data by parsing the stream of personal data into a plurality of data segments, flagging each data segment that does not comply with the first privacy level directive, and redacting each flagged data segment in the first sanitized stream by copying each non-flagged data segment into the first sanitized stream and not copying each flagged data segment, such that the first sanitized stream consists of a plurality of non-flagged data segments copied from the stream of personal data; and grant each winning personal data consumer access to the first sanitized stream of personal data.

11. The system of claim 10, wherein the one or more smart devices comprise at least one of a wearable device, an Internet of Things (IoT) device, and a smart home appliance.

12. The system of claim 10, wherein the personal data comprises personal data related to at least one of finances, education, utility usage, shopping or spending habits, activities, hobbies, commercial transactions, social networks, media preferences, telematics data, interconnected home data, insurance-related information, or smart or autonomous vehicle data.

13. The system of claim 10, wherein the stream of personal data further comprises personal data related to a family which includes the owner of the personal data.

14. The system of claim 10, wherein the computer-executable instructions that cause the system to grant each winning personal data consumer access to the first sanitized stream of personal data cause the system to grant the respective winning personal data consumer at least one of a right to view the first sanitized stream of personal data or a right to control a source of the first sanitized stream of personal data.

15. A computer-readable medium having computer-executable instructions for operating a data bank of personal data stored thereon that, when executed by one or more processors of a system, cause the system to:

receive a stream of personal data from one or more smart devices, the stream of personal data corresponding to an owner of the personal data;

receive, from the owner of the personal data, first and second privacy level directives corresponding to the stream of personal data;

notify, via an indication, the owner of the personal data of an activated purchase opportunity by one or more consumers of personal data based upon the personal data;

receive, from the one or more consumers of personal data, one or more bids associated with first offer terms;

cause an indication of the one or more bids to be presented to the owner of the personal data;

receive, from the owner of the personal data, an indication of an acceptance of a set of winning bids of the one or more bids, each of the winning bids corresponding to the first offer terms and being associated with a winning personal data consumer of the one or more consumers of personal data;

cause the stream of personal data to be sanitized according to the first privacy level directive to create a first sanitized stream of personal data by parsing the stream of personal data into a plurality of data segments, flagging each data segment that does not comply with the first privacy level directive, and redacting each flagged data segment in the first sanitized stream by copying each non-flagged data segment into the first sanitized stream and not copying each flagged data segment, such that the first sanitized stream consists of a plurality of non-flagged data segments copied from the stream of personal data; and grant each winning personal data consumer access to the first sanitized stream of personal data.

16. The computer-readable medium of claim 15, wherein the one or more smart devices comprise at least one of a wearable device, an Internet of Things (IoT) device, and a smart home appliance.

17. The computer-readable medium of claim 15, wherein the personal data comprises personal data related to at least one of finances, education, utility usage, shopping or spending habits, activities, hobbies, commercial transactions, social networks, media preferences, telematics data, interconnected home data, insurance-related information, or smart or autonomous vehicle data.

18. The computer-readable medium of claim 15, wherein the stream of personal data further comprises personal data related to a family which includes the owner of the personal data.

19. The computer-readable medium of claim 15, wherein the computer-executable instructions that cause the system to grant each winning personal data consumer access to the first sanitized stream of personal data cause the system to grant the respective winning personal data consumer at least one of a right to view the first sanitized stream of personal data or a right to control a source of the first sanitized stream of personal data.

20. The computer-readable medium of claim 15, wherein the computer-executable instructions further cause the system to:

after granting access to the first sanitized stream of personal data, receive an indication from the owner of the personal data that permission for at least one winning personal data consumer to access the first sanitized stream of personal data has been revoked; and terminate the access of the at least one winning personal data consumer to the first sanitized stream of personal data.

* * * * *